(12) United States Patent
Mueller et al.

(10) Patent No.: US 7,160,047 B2
(45) Date of Patent: Jan. 9, 2007

(54) FUNCTIONAL ELEMENT ARRANGEMENT, FUNCTIONAL ELEMENT, AUXILIARY ASSEMBLY ELEMENT, ASSEMBLED COMPONENT AND METHOD FOR PRODUCING AN ASSEMBLED COMPONENT

(75) Inventors: Rudolf Mueller, Frankfurt am Main (DE); Richard Humpert, Rosbach (DE)

(73) Assignee: Profil Verbindungstechnik GmbH & Co. KG (DE)

( * ) Notice: Subject to any disclaimer, the term of this patent is extended or adjusted under 35 U.S.C. 154(b) by 279 days.

(21) Appl. No.: 10/239,480

(22) PCT Filed: Feb. 23, 2001

(86) PCT No.: PCT/EP01/02093

§ 371 (c)(1),
(2), (4) Date: Feb. 24, 2003

(87) PCT Pub. No.: WO01/73305

PCT Pub. Date: Oct. 4, 2001

(65) Prior Publication Data

US 2004/0016111 A1    Jan. 29, 2004

(30) Foreign Application Priority Data

Mar. 27, 2000   (DE) ................. 100 15 239

(51) Int. Cl.
*F16B 5/01* (2006.01)
*B21J 15/02* (2006.01)

(52) U.S. Cl. ............ 403/283; 403/279; 403/282; 403/285; 29/512; 29/525.06; 29/525.13; 29/796; 411/177; 411/181; 411/183

(58) Field of Classification Search ............ 411/103, 411/105, 106, 107, 111, 113, 116, 166, 176, 411/177, 179, 181, 183, 386, 499; 29/432, 29/512, 432.1, 432.2, 522.1, 525.02, 525.06, 29/525.11, 525.13, 716, 795, 796, 818, 243.519; 403/22, 277, 279, 281, 282, 283, 285
See application file for complete search history.

(56) References Cited

U.S. PATENT DOCUMENTS 1,112,525 A * 10/1914 Darling .................. 248/187.1
1,705,463 A *  3/1929 Andren ..................... 411/180

(Continued)

*Primary Examiner*—Essama Omgba
(74) *Attorney, Agent, or Firm*—Hunton & Williams LLP; Eugene C. Rzucidlo

(57) ABSTRACT

A functional element arrangement which includes a functional element which is to be mounted on a component, especially but not exclusively on a brittle or non-rigid component made of a material containing cavities or pores, e.g. plastic, wood, metal foams, plastic or metal filled with hollow bodies, or another relatively soft material, selectively embodied as a sandwich construction or as a composite material e.g. in the form of a single layered or multilayered structure comprising, for example, two layers of sheet metal or plastic and a core made of one of the above-mentioned materials. The invention is characterized in that it is provided with an auxiliary assembly element which enables the functional element to be blocked using forming techniques when it is mounted on the component in a riveting process or a stamping and riveting process. The invention is further characterized in that, preferably, at least one device is provided to ensure rotational security between the functional element and the component and/or between the auxiliary assembly element and the component. The invention also relates to a functional element, an auxiliary assembly element, an assembled component and various methods for producing assembled components.

41 Claims, 16 Drawing Sheets

U.S. PATENT DOCUMENTS

Figure 1A:
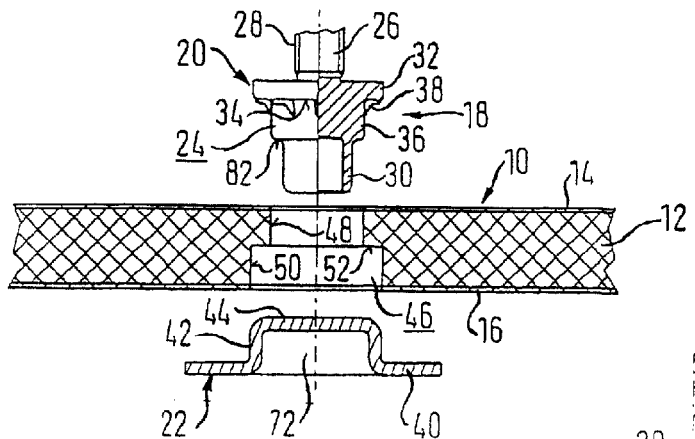

| | | | |
|---|---|---|---|
| 1,759,339 A * | 5/1930 | Andren | 411/180 |
| RE17,907 E * | 12/1930 | Andren | 411/180 |
| 1,872,385 A * | 8/1932 | Andren | 411/180 |
| 1,872,616 A * | 8/1932 | Andren | 411/183 |
| 2,985,213 A * | 5/1961 | Consandine | 411/183 |
| 3,053,300 A * | 9/1962 | Quinto | 411/180 |
| 3,451,303 A * | 6/1969 | Biermann | 411/70 |
| 3,909,927 A * | 10/1975 | Steward | 29/525.02 |
| 4,543,701 A * | 10/1985 | Muller | 29/432.1 |
| 4,727,646 A * | 3/1988 | Muller | 29/798 |
| 5,003,673 A * | 4/1991 | Nysten | 24/662 |
| 5,586,993 A * | 12/1996 | Saito et al. | 29/623.2 |
| 5,613,815 A * | 3/1997 | Muller | 411/181 |
| 5,665,483 A * | 9/1997 | Saito et al. | 429/53 |
| 6,817,815 B1* | 11/2004 | Ross | 411/180 |
| 6,961,986 B1* | 11/2005 | Muller | 29/432.2 |
| 6,979,160 B1* | 12/2005 | Babej et al. | 411/179 |
| 6,994,486 B1* | 2/2006 | Babej | 403/274 |
| 7,086,817 B1* | 8/2006 | Clinch et al. | 411/111 |
| 2006/0056937 A1* | 3/2006 | Babej et al. | 411/181 |

* cited by examiner

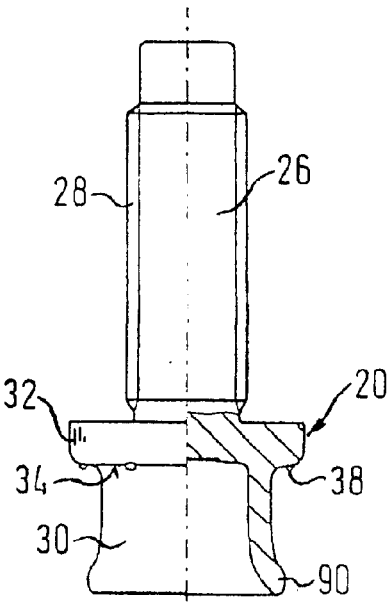
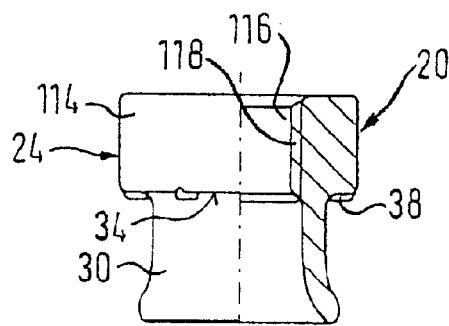
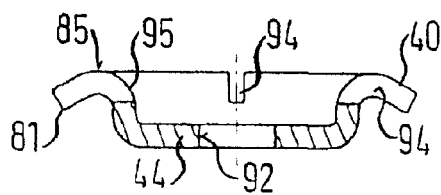
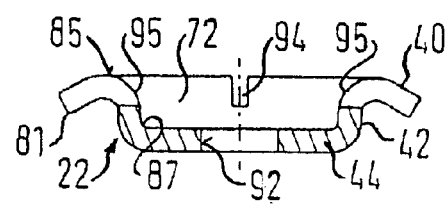
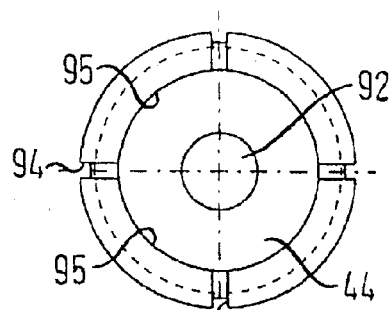
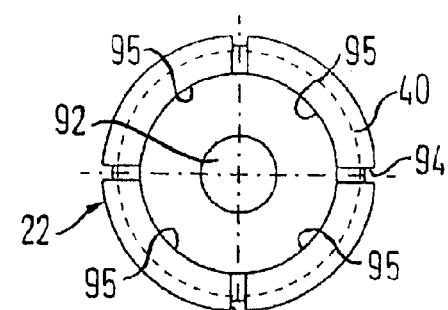

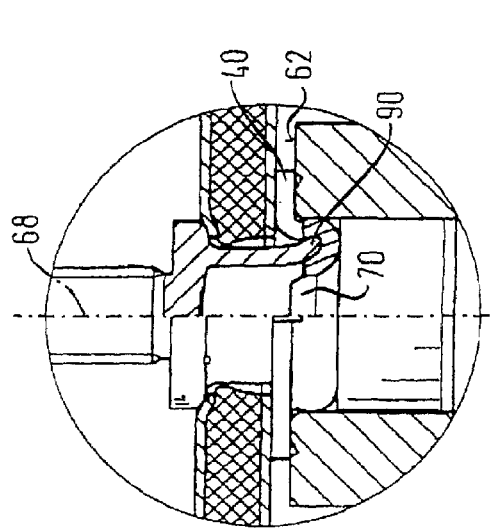
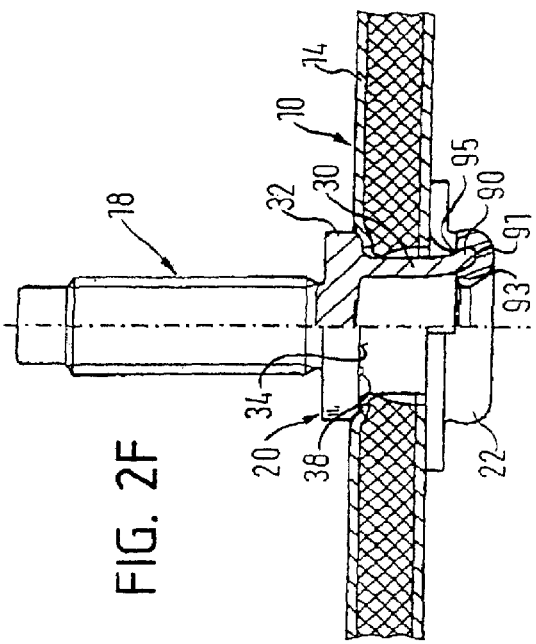
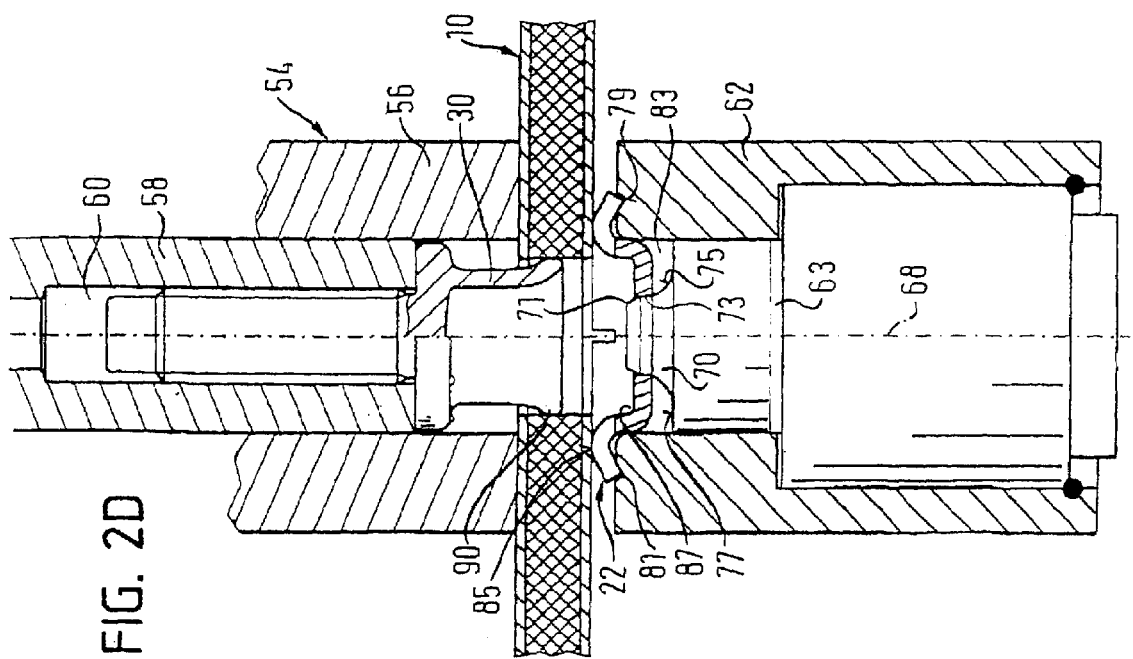

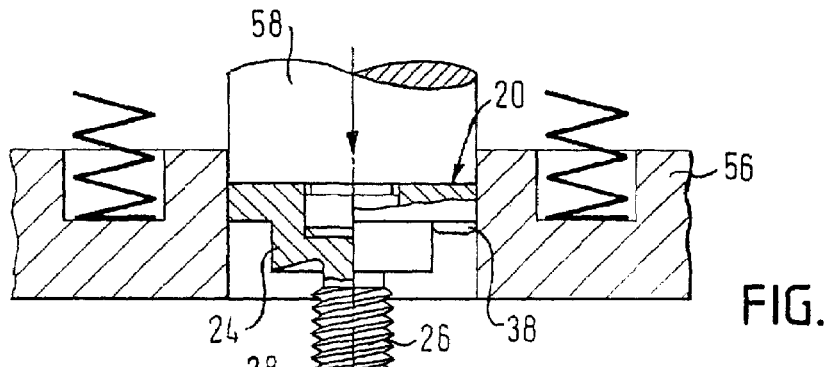
FIG. 4A
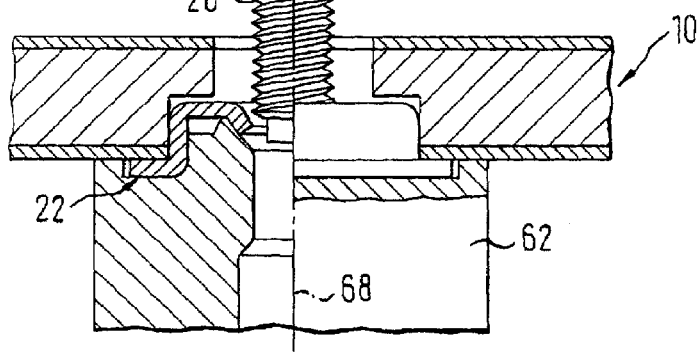
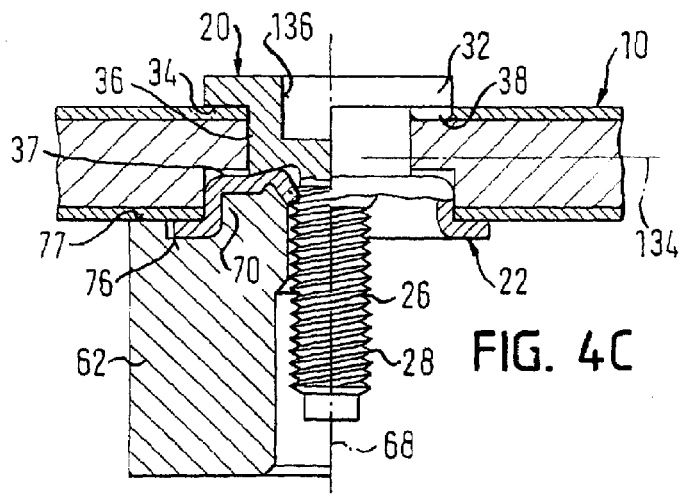
FIG. 4C
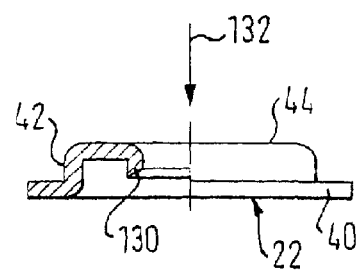
FIG. 4B
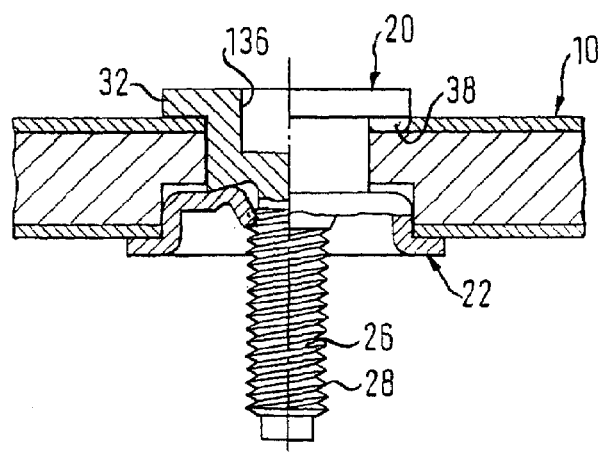
FIG. 4D

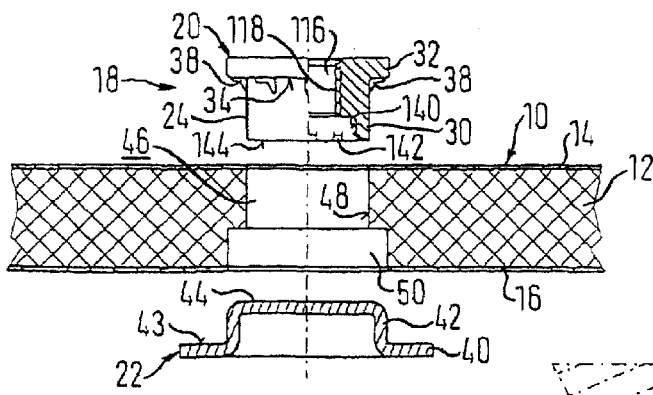
FIG. 6A
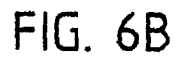
FIG. 6B
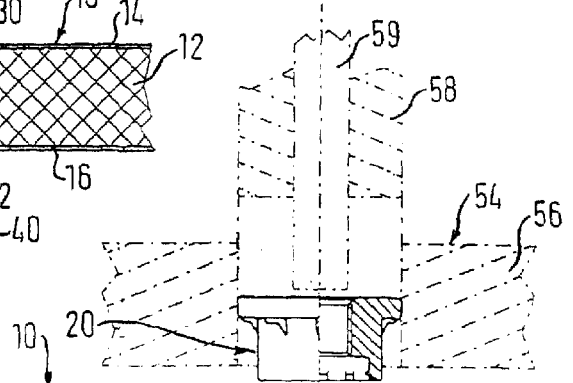
FIG. 6C
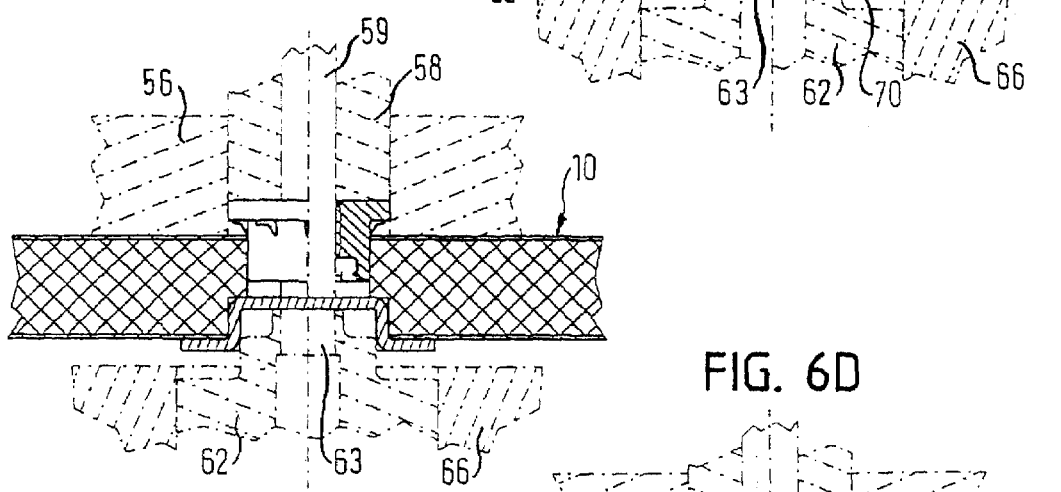
FIG. 6D
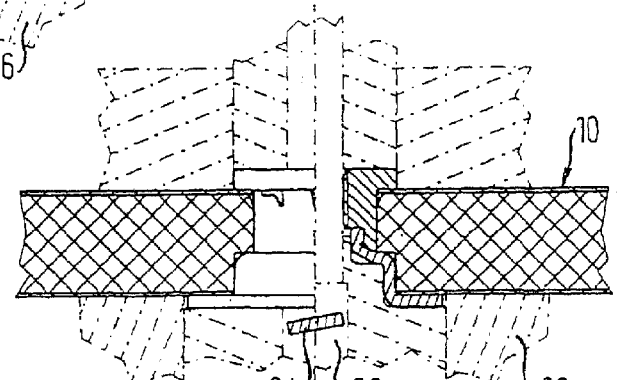
FIG. 6E
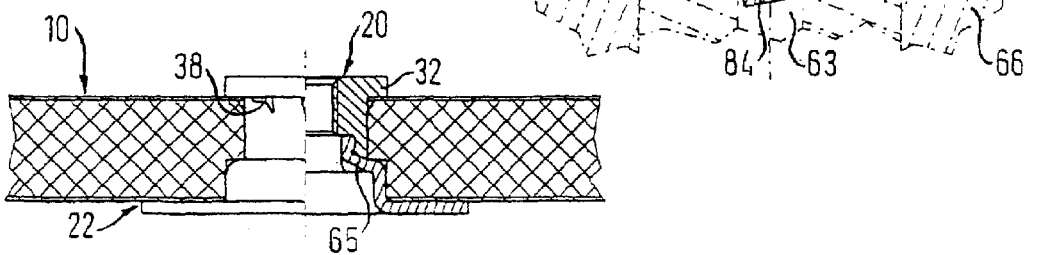

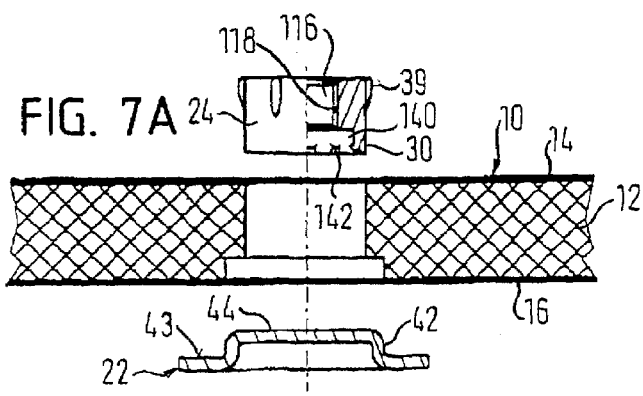
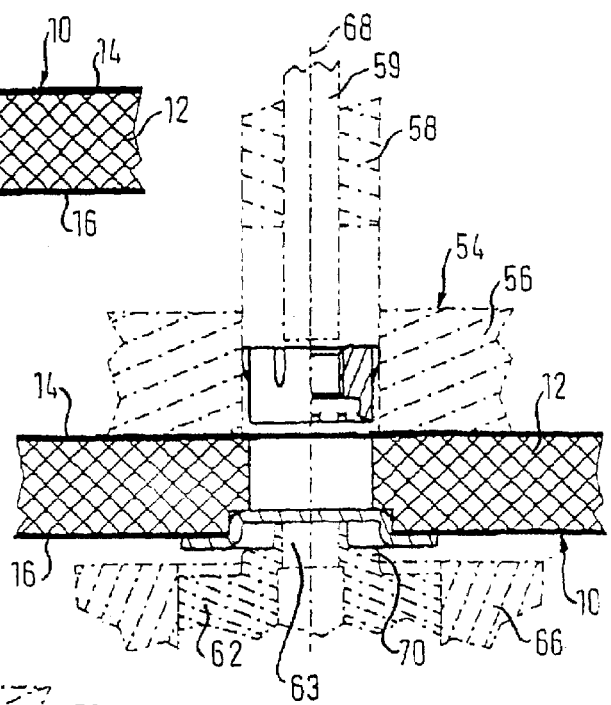
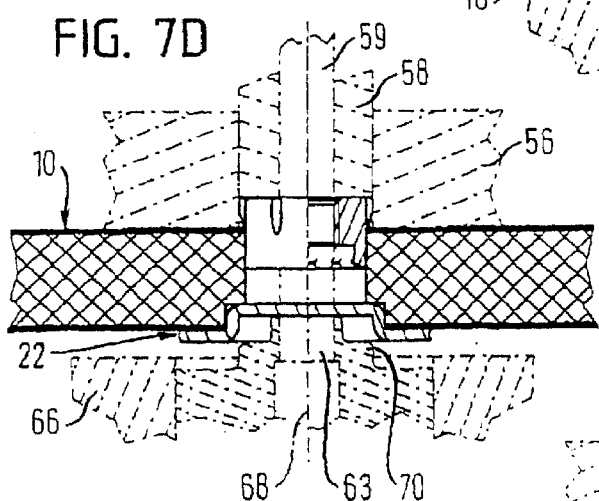
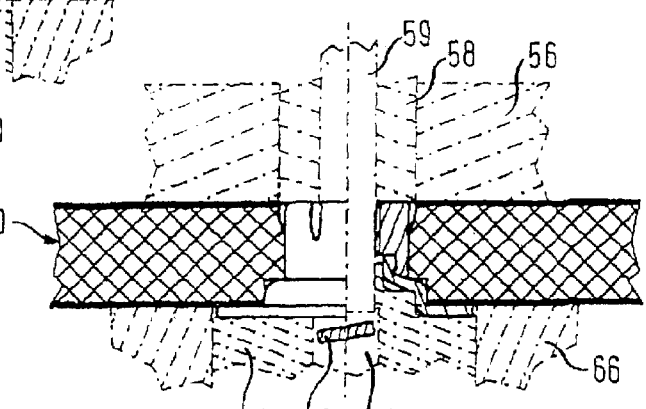
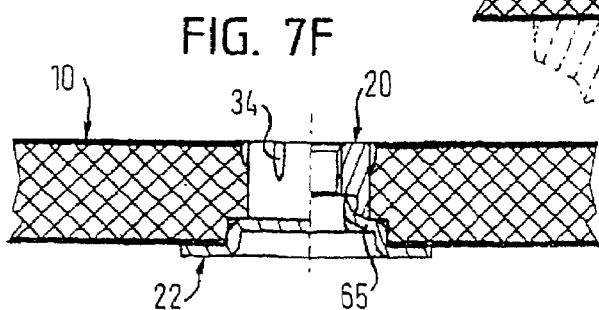

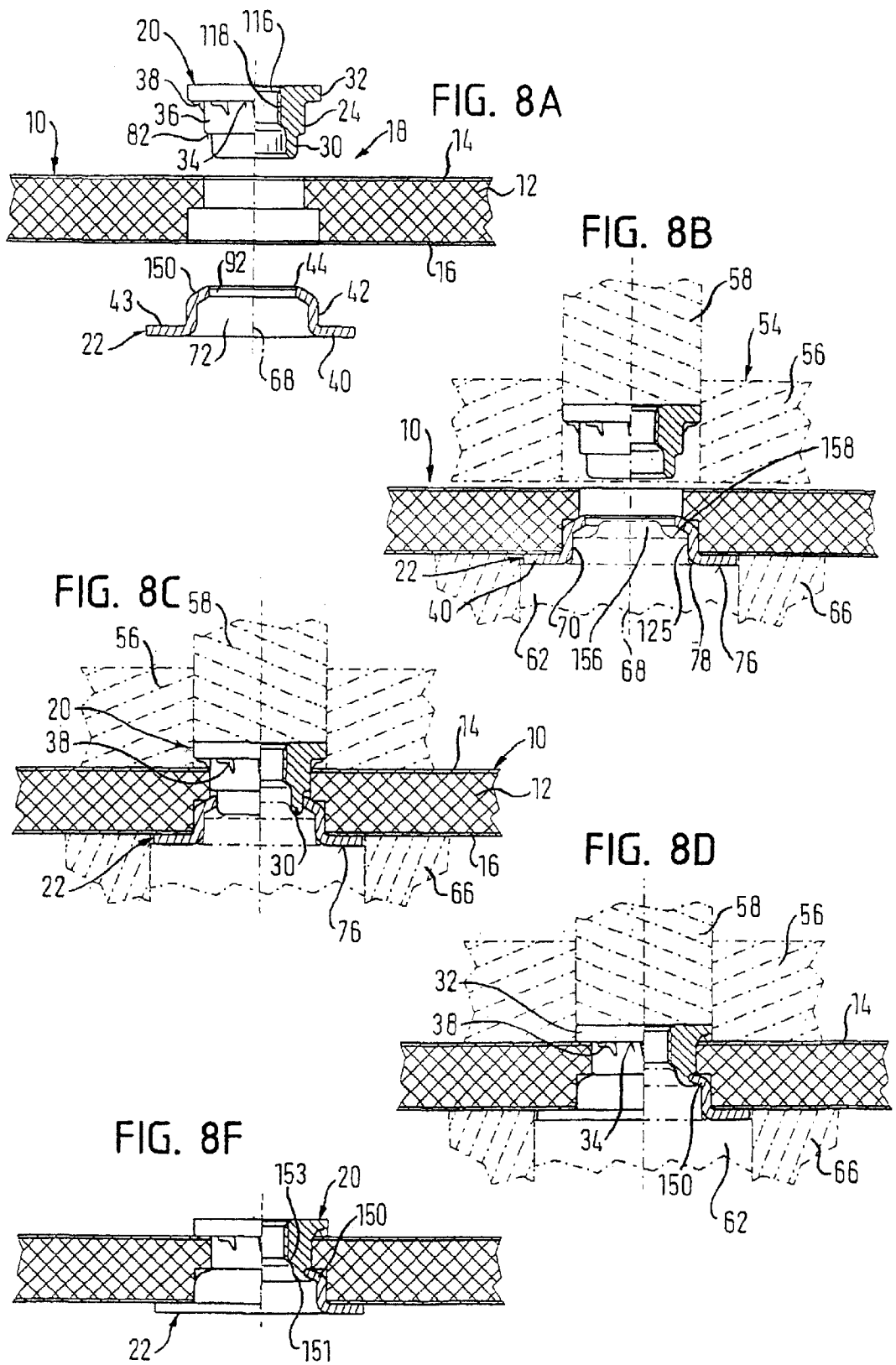

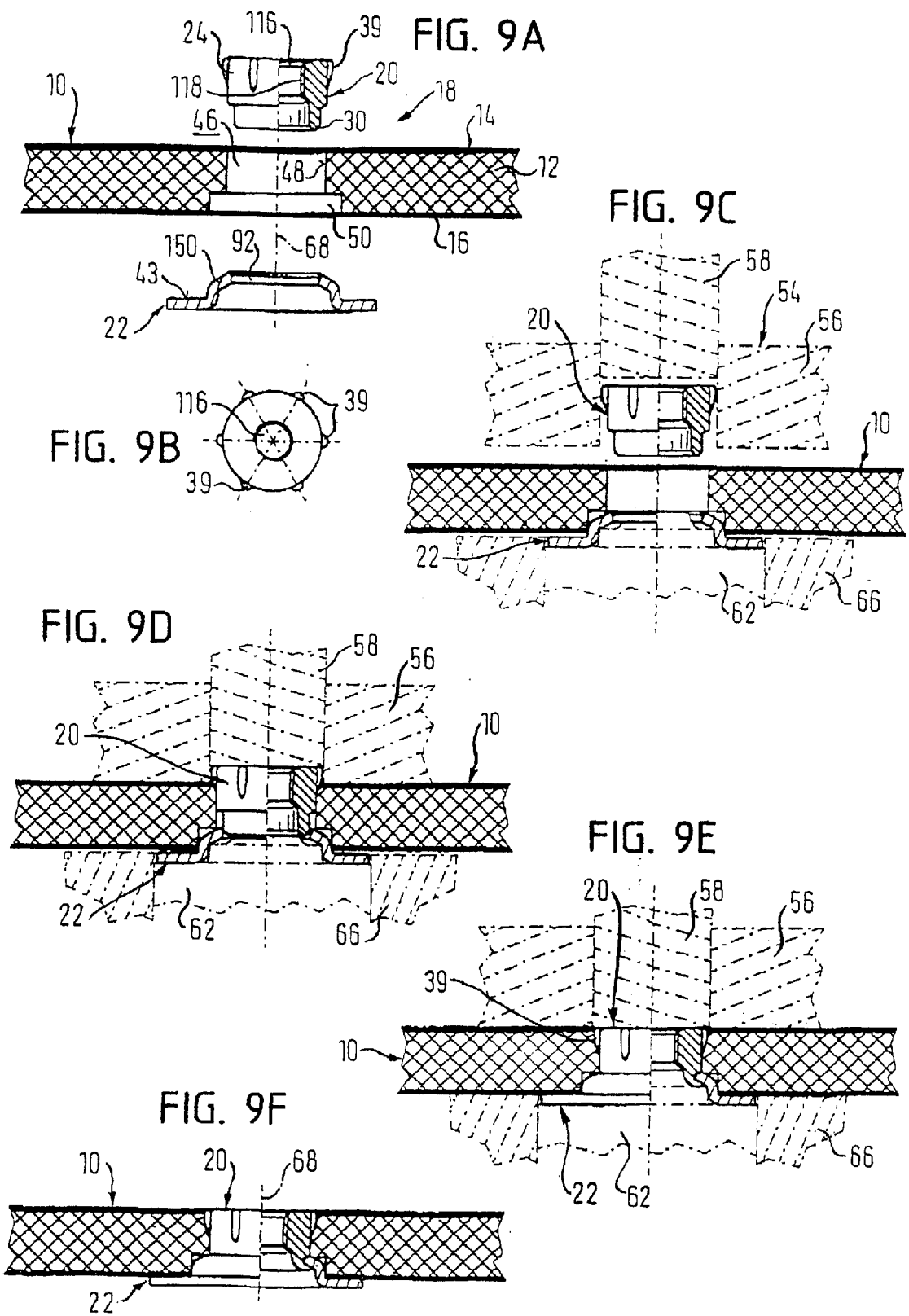

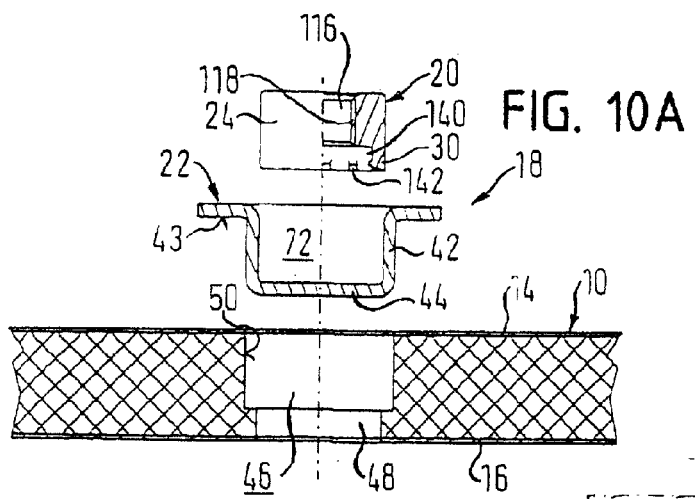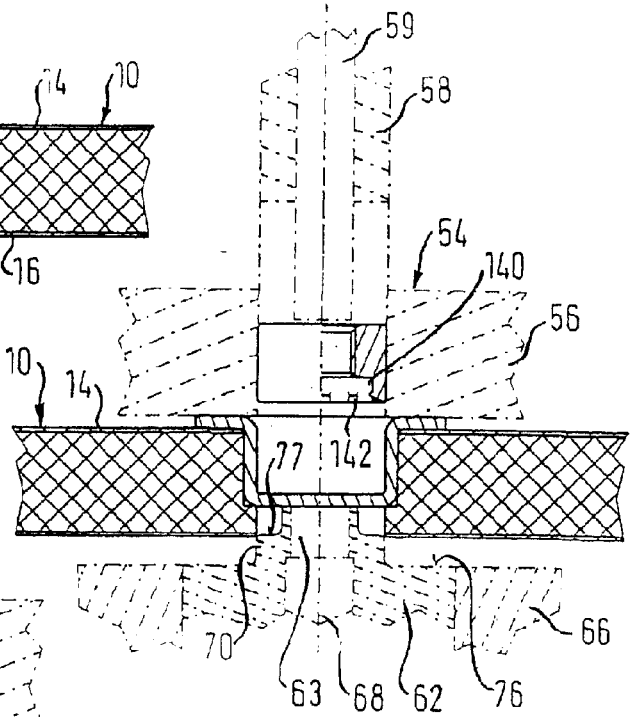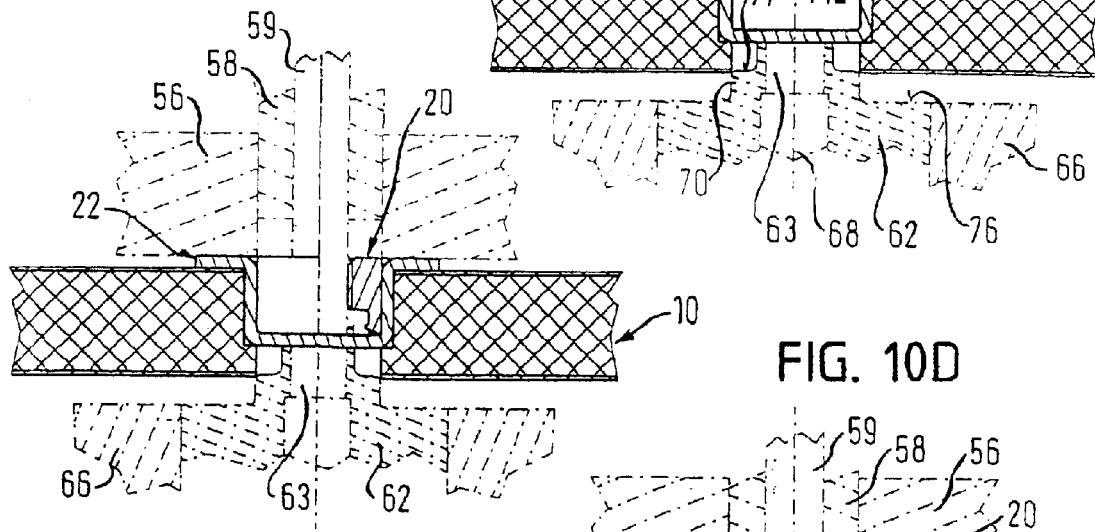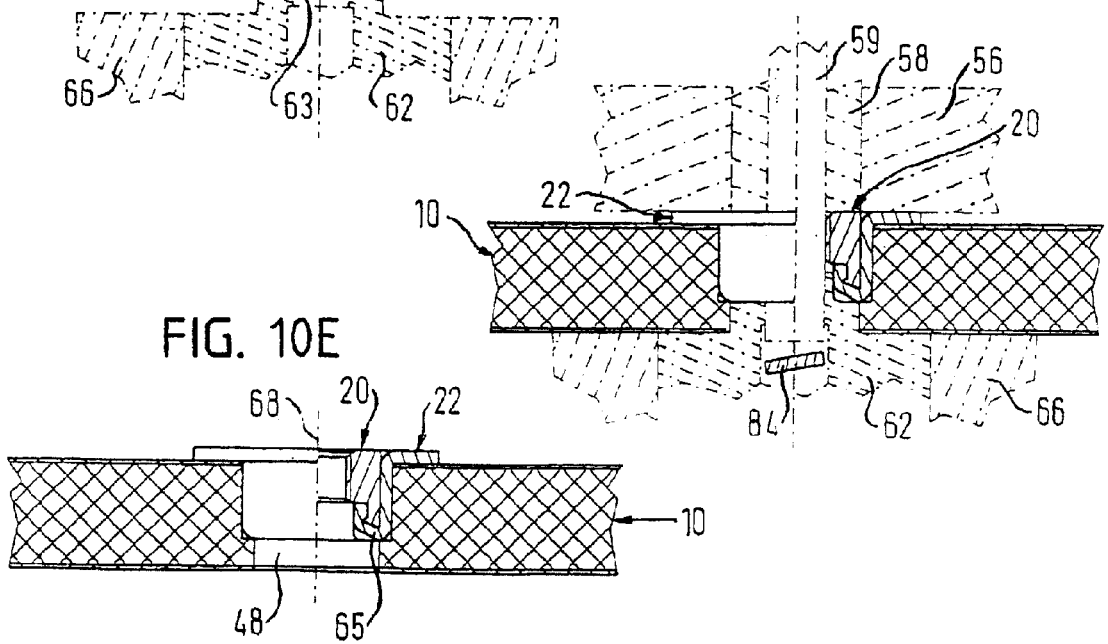

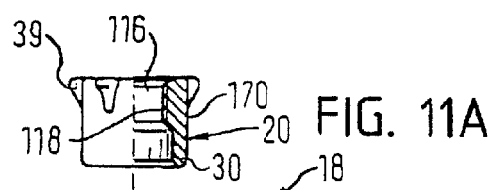
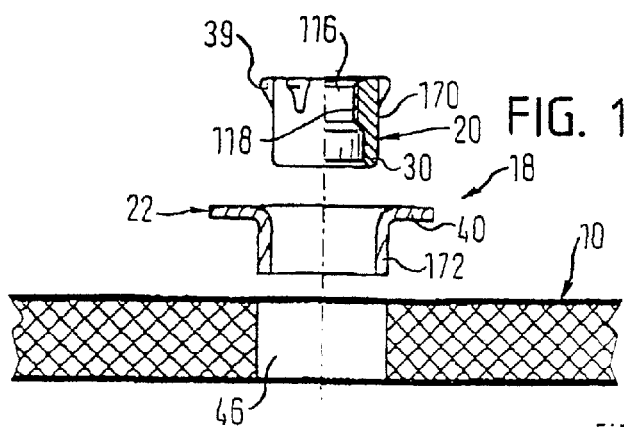
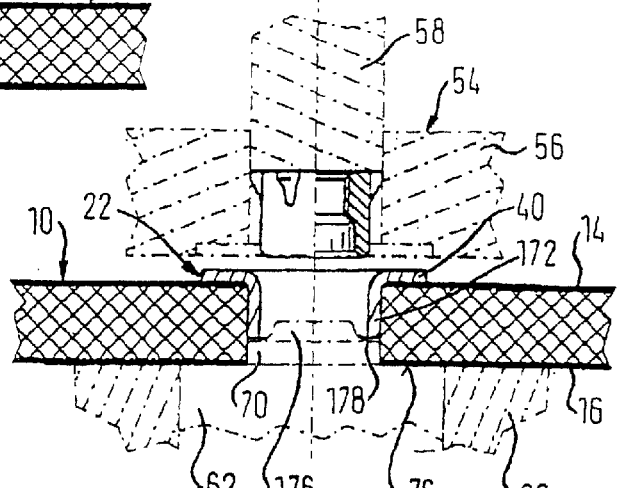
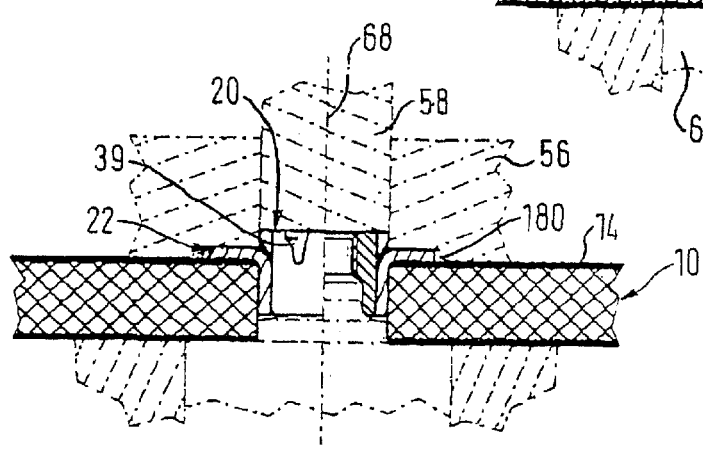
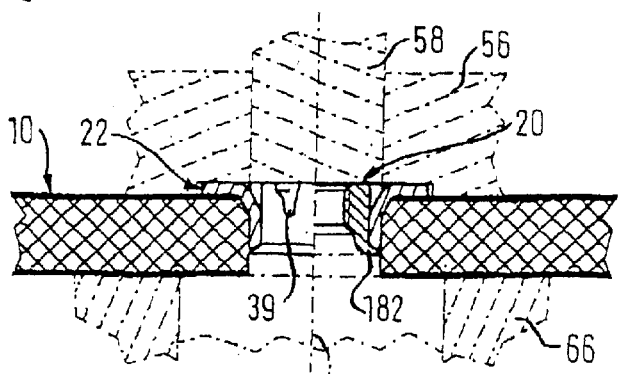
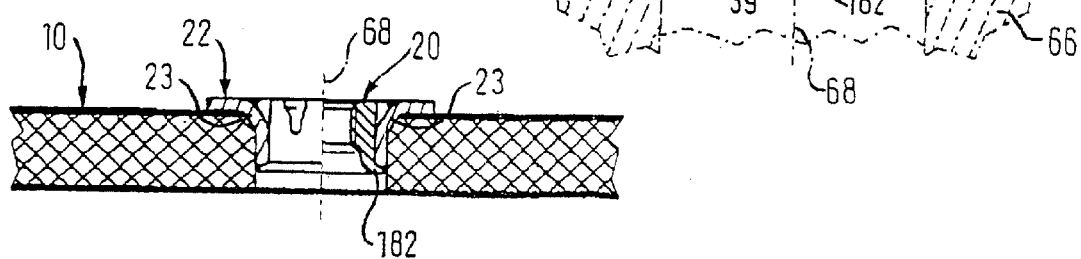

FUNCTIONAL ELEMENT ARRANGEMENT, FUNCTIONAL ELEMENT, AUXILIARY ASSEMBLY ELEMENT, ASSEMBLED COMPONENT AND METHOD FOR PRODUCING AN ASSEMBLED COMPONENT

The present invention relates to a functional element arrangement for attachment to a component, in particular, however, not exclusively, for attachment to a brittle or yielding component which consists of a material containing hollow cavities or pores, such as for example plastics, wood, metal foams, metals filled with hollow bodies, or plastics, or another relatively soft material, and which is present optionally in the form of a sandwich construction or as a composite material, for example in the form of a one or multi-layered structure with, for example, two sheet metal or plastic layers and a core of one of the above named substances or materials. The invention relates furthermore to a component assembly comprising a combination of such a functional element arrangement and a component as well as elements for use in a functional element arrangement and a method for attaching a functional element arrangement to a component.

Functional elements, in particular in the form of fastener elements, such as nut elements and bolt elements, are known in the most diverse embodiments and are sold by a number of companies, such as Profil Verbindungstechnik GmbH & Co. KG in Friedrichsdorf, Germany, or FabriSteel Products, Inc. in Michigan, USA.

The known functional elements are essentially designed for attachment to sheet metal parts in the industrial manufacture of a broad spectrum of products, such as for example vehicle parts or washing machines, and are either inserted in self-piercing manner or in pre-pierced sheet metal parts by means of presses, robots, or portable tools, and riveted to them. In this way a component assembly arises consisting of one or more functional elements attached to a sheet metal part.

By way of example, the functional element can be a bolt element having a head section and a shaft section, with the bolt element being riveted in the region of the head section or in the region of the transition between the head section and the shaft section to the sheet metal part and with the shaft part carrying a thread which serves for the attachment of a further component to the component assembly comprising the sheet metal part and the bolt element, with the further component being secured to the component assembly by means of a nut screwed onto the thread of the bolt element.

Alternatively to this, the functional element can be a nut element which is, for example, riveted in the region of one of its end faces or in the region of a flange section to the sheet metal part. The corresponding element then carries an internal thread which serves to receive a screw or a bolt with which a component can be screwed to the sheet metal part.

The designation "Funktionselement" (in English "functional element") is not only concerned with elements which have a thread, but rather also with elements which serve other functions. By way of example, functional elements are known with a head section and a shaft section, with the shaft section serving as a guide spigot, or having a spherical shape at its free end, which can, for example, be part of a ball joint. Similar functional elements are also known which carry a clip mount. Functional elements are also known which are present in the form of hollow elements and which, for example, serve as a hollow guide or to receive plugged-in parts. The designation "Funktionselement" (in English "functional element") has become established as a designation for elements which are, on the one hand, secured to a sheet metal part and, on the other hand, carries something, whether it is an external thread, and internal thread, a guide spigot, a spherical head, a clip mount, or a mount for a plugged-in part, with this list merely serving for explanation and not to be understood as a restrictive definition.

As brought out above, the known functional elements are principally intended for attachment to sheet metal parts.

There are, however, a whole series of components which are not present as pure sheet metal parts, but must also be equipped with functional elements in order to enable an attachment to another component or to realise a carrying or guiding function.

Such components are frequently brittle or yielding components which consist of a material having hollow cavities or pores and frequently present as composite materials. As examples, all materials can be named which serve for the manufacture of components, in particular brittle or yielding components, which can be equipped with functional elements:

Metal Foams

These are highly porous metal materials, the pore size and distribution of which can be set in a defined manner in the manufacturing process and for which a broad spectrum of possible applications are interesting. Such metal foams offer, amongst other things, material and weight savings and thus also cost savings for a number of components. They can absorb impact energy by progressive deformation and are thus usable, for example, for energy absorbing parts, for example for constructional parts of vehicles which are intended to absorb impact energy during accidents for the protection of the occupants. Moreover, they have excellent damping characteristics so that they absorb or attenuate sound waves and mechanical oscillations well.

Known, amongst other things, are metal foams of aluminium and magnesium and also metal foams of steel. Various manufacturing methods are known which can be used for the production of such metal foams. For example, metal powder can be mixed with a chemical compound which later brings about the foaming of the metal during a thermal treatment. At the melting point of a metal, gas is liberated which leads to the foaming. In this manner aluminium foams have already been successfully produced which have a gas component of up to 97%. Steel foams can also be manufactured with this process. The process is utilised for a broad spectrum of elements and alloys. The possibility also exists of manufacturing metal structures of hollow spheres, for example hollow steel spheres.

For the manufacture of magnesium foams with a proportion of up to 60% of gas it is known to embed thin-wall ceramic hollow spheres into a magnesium matrix in a technical casting process, with magnesium alloys also being utilised and being freely selectable.

Depending on the matrix alloy, such materials can be more rigid and brittle, but also softer and more ductile than the starting alloy.

After manufacturing the foams these are frequently provided with a cast skin which are either removed or smoothed with a filling material. Foams with a cast skin, which is optionally filled with a filling material, form a type of sandwich structure.

Sandwich Structures with Metal Foams

For the production of composite materials in the form of a sandwich structure with a core of a metal foam, the above described metal foams can be produced with or without a cast skin and can be provided with upper and/or lower covering layers, of sheet metal or plastic respectively.

Through the application of layers or plies onto the core characteristics such as resistance to scratching, low or high friction, corrosion resistance, and also favourable wear characteristics can be obtained. The corresponding components, i.e. any covering layers that are present, can also be coated with all known coating processes, i.e. with galvanic coatings, paint coatings or coatings carried out by means of PVD methods, amongst other things. When providing sheet metal layers on a core of foam, the sheet metal layers can be adhered or bonded onto the metal foam core, for which purpose soldering and brazing methods also can be considered. For cover layers of plastic adhesives are normally used in order to achieve the bond to the core.

Another method for producing sandwich structures consists of providing hollow sections of metal or plastic, for example in the form of sections produced by means of extrusion, fully or regionally with a metal foam core. This can take place by the introduction of elongate strips of metal foam, optionally with a surface bonding of the metal foam to the section, or by the foaming of metal/foam material mixtures in the hollow section. Open sections or shaped sheet metal parts with an insert of a metal foam (insert of a layer of metal foam or of a plurality of layers of metal foam) can be provided and can then be covered over with a cover strip or cover section which is secured in the marginal region to the open section by means of welding, riveting, adhesive bonding or otherwise. Instead of metal foams, plastic foams or other materials can also be used in such composite structures. A specific use of such sections filled with metal foam or with a plurality of fillers is the use as a B-post of a motor vehicle which can be manufactured by the filling of a pre-manufactured section, optionally with subsequent shaping by bending or pressing.

The desired mechanical characteristics can be set by the section-wise filling of such sections. For example, the desired stiffness, i.e. resistance to buckling, can be set in the one region and in another region with a desired deformation can be achieved, for example in the event of an accident.

Other Sandwich Structures

Composite materials which consist of a core with a honeycomb structure and of upper and/or lower covering layers also come into question, with the covering layers being able to consist of sheet metal or of plastic panels. The honeycomb structure can be of metal or metal foils or of card or paper or of a plastic or of cellulose or ligno cellulose.

Materials with Brittle Fracture Characteristics

Such materials include, amongst other things, cast parts of, for example, magnesium, magnesium alloys and thermo-setting plastics, with and without fillers. Such materials can likewise be used for components which can be equipped, in accordance with the invention, with functional element arrangements.

Further Component Materials and Constructions

Plastic components, components of woods or particle boards or the like can also be considered for component assemblies in accordance with the invention, with such materials normally being regarded as yielding, since they normally yield significantly under the forces which prevail during the manufacture of a rivet connection.

Composite materials are also in particular conceivable which consist of a combination of one or more of the above named materials, for example multi-ply arrangements, which consist of a plurality of layers bonded to one another, whereby, for example, thicker components, or components with more complex forms, can be built up.

Although the invention is principally intended for use with such components, which are normally understood to be yielding as mentioned above, it can also be used without restriction with solid components which are essentially understood not to be yielding, for example thicker metal panels or components of brittle materials, in which one has to work with large contact surfaces in order to avoid a crack formation in the material.

The object of the present invention is to provide a functional element arrangement for attachment to a component, in particular—but not exclusively—for attachment to a yielding component, which, on the one hand, makes it possible to produce a component assembly which enables an attachment to another component, taking account of the special characteristics of the respective components, such as yieldability, brittleness, ductility, flexibility, strength, deformability, without the forces which arise as a result of this attachment leading to an undesired deformation or damaging of the first named component.

Furthermore, the invention is based on the object of providing a method for the manufacture of such a component assembly, which makes it possible to attach a functional element to a component under controllable conditions, so that the component assembly enables an attachment to a further component using the functional element without the forces which arise as a result of the attachment leading to a deformation or damaging of the first named component or of the component assembly.

A further object of the present invention is to provide an element for attachment to a component, in particular—but not exclusively—for the attachment to a yielding component, in which the design of the element and also the nature of the attachment of the element to the component ensures a corrosion-protected connection between the element and the component.

In order to satisfy these objects, a functional element of the initially named kind is provided in accordance with the invention which is characterised in that an auxiliary joining part is provided, in that the functional element can be locked in a technically reformed manner during the attachment to the component by means of a riveting process or a piercing and riveting process to the auxiliary joining part, and in that preferably at least one means is provided in order to ensure security against rotation between the functional element and the component and/or between the auxiliary joining part and the component.

The component is preferably pre-holed, for example by a drilling process or by a punching process. Even if the functional element which is used with the present invention is made self-piercing it is normally not used to pierce the component but rather the auxiliary joining part, with it however not being precluded that a self-piercing functional element could also be used to pierce the component. Components which are to be equipped in accordance with the invention can also be pre-holed by primary forming, i.e. the hole is introduced into the component during the original manufacture of the component, for example during casting of the component or during a pressure die-casting process or an injection moulding process.

The term component also includes a component assembly consisting of two or more components placed against one another. It is namely an advantage of the functional element arrangement of the present invention that there is in principle no restriction on the thickness of the respective components, so that two, three or more individual components can be joined together with the functional element arrangement of the invention to form a component assembly to which any further component (or further components) can be attached using the functional element. If the functional element is, for example, formed as a bolt element, then the further component (or the further components) can be secured to the component assembly by a nut which should be screwed onto the bolt element. When the functional element is formed as a nut, a screw can be used in order to secure a further component (or further components) to the first named component. The functional element can ultimately also be formed as a hollow rivet, so that a further component (further components) can be secured to the first named component via a rivet connection.

It is, however, particularly preferred when both functional elements and also the auxiliary joining part are deformable when carrying out the riveting process for the formation of the interlock. Experience shows that an arrangement of this kind leads to a particularly firm connection between the functional element and the auxiliary joining part which is also secure against rotation.

It is particularly favourable when the functional element and the auxiliary joining part can be joined to one another and to the component coming from opposite sides of the component. This facilitates, on the one hand, the automatic supply of the functional element and of the auxiliary joining part into the tooling provided for the attachment and moreover ensures a favourable alignment of the two parts to one another.

It is particularly favourable when the functional element and the auxiliary joining part each have a flange forming a contact surface against which the component comes into contact, i.e. between which the component is trapped, i.e. clamped. An arrangement of this kind represents a particularly reliable possibility process-wise for connecting the functional element arrangement and the auxiliary joining part to one another and to the component. Since the component is arranged between the two flanges and the spacing between the two flanges can be precisely preset by the design of the functional element and of the auxiliary joining part any compression or deformation of the component which takes place does so in a precisely controlled manner, so that during series manufacture the desired result, principally the characteristics of the component assembly can be reliably ensured piece by piece.

It is, however, not absolutely essential that the two parts, i.e. the functional element and the auxiliary joining part, have a flange. On the contrary, it is sufficient with some functional elements when only the auxiliary joining part has a flange forming a contact surface against which the component comes into contact. With such a design, the further component is then attached to the side of the first named component remote from the flange of the auxiliary joining part.

The functional elements which can be used can be subdivided into various categories. For example, there are functional elements which, in known manner, are provided with a head section and a shaft section, with the functional element having in the region of the head section or in the region of the transition from the head section to the shaft section a rivet section for the riveted connection to the auxiliary joining part. The shaft section can be formed as a thread carrier, as a guide part, or as a clip mount.

As an alternative to this the functional element can also be formed as a hollow body element, for example a nut element, as a guide sleeve, or as a mount for a plug-in part.

When the functional element is provided with a head section and a shaft section then it can be designed in an embodiment similar to an SBF bolt of the company Profil Verbindungstechnik GmbH & Co. KG in that the head section has a flange in the region of the transition to the shaft section, with the surface of the flange remote from the shaft section forming a contact surface against which the component comes into contact, with the head section having a rivet section for riveting to the auxiliary joining part at the end remote from the shaft section.

It is particularly favourable when the head section has an intermediate step between the flange and the rivet section. The intermediate step then serves for the centring of the functional element within the component and moreover forms a type of spacer element between the flange and the auxiliary joining part, which is favourable for the mechanical characteristics of the component assembly.

With a design of this kind, features providing security against rotation can be provided in the region of the contact surface of the flange and/or in the region of the transition to the intermediate step and/or at the intermediate step. In this way the required security against rotation relative to the component is produced. The rivet connection between the rivet section and the auxiliary joining part then primarily serves the task of the axially rigid attachment of the functional element to the component.

When the intermediate step merges into the rivet section at a ring shoulder, features providing security against rotation can also be provided in the region between the intermediate step and the rivet section, for example at the ring shoulder and/or in the region of the transition of the ring shoulder into the rivet section and/or at the rivet section itself.

In another design of the functional element, for example similar to an EBF bolt of the company Profil Verbindungstechnik GmbH & Co. KG, the head section has in the region of its free end remote from the shaft section a flange forming a contact surface against which the component comes into contact and is formed in the region of the transition from the head section into the shaft section for the riveting to the auxiliary joining part, i.e. is provided there with an external forming section.

A design of this kind signifies that in an EBF bolt an intermediate step is introduced between the flange (the previous head section of the EBF bolt) and the rivet section or external forming section located in the region of the transition into the shaft section. This intermediate step, which can be made hollow for weight saving, offers, on the one hand, the same advantages as the above described intermediate step and also leads to the possibility of improving the security on the functional element arrangement against rotation. Features providing security against rotation can namely be provided in the region of the contact surface of the flange and/or in the region of the transition from the flange into the intermediate step and/or at the intermediate step, so that here an attachment to the component which is secured against rotation takes place. Since the intermediate step merges via a ring shoulder into the shaft part, features providing security against rotation can be provided alternatively or in addition to the already discussed features providing security against rotation in the region of this ring shoulder, for example at the ring shoulder and/or in the region of the transition of the ring shoulder into the rivet section or external forming section and/or at the rivet section or external forming section itself.

In this way the auxiliary joining part is secured in a rotationally secure manner to the functional element, so that with a rotationally secure arrangement of the auxiliary joining part at the component, for example through the use of a corresponding adhesive, a further increase of the security against rotation can be obtained.

When the functional element is formed as a hollow body element it can have a head section and a rivet section or internal forming section, with the head section, for example, being subdivided into a flange and an intermediate step, with the flange forming a contact surface against which the component comes into contact and being arranged in the region of the intermediate step remote from the rivet section. In this arrangement the intermediate step also offers the above mentioned advantages.

Furthermore, features providing security against rotation can be provided in the region of the contact surface and/or at the transition from the contact surface into the intermediate step and/or at the intermediate step. With this design, features providing security against rotation are thus provided at or in the region of the contact surface of the flange and can thus cooperate in a particularly secure manner with the upper covering layer of the component to ensure the required security against rotation.

Since the upper covering layer normally has a higher strength than the core containing the hollow cavities, a high quality of security against rotation is achieved hereby, as in the above discussed similar embodiments.

In this arrangement an intermediate step can also merge via a ring shoulder into the rivet section and features providing security against rotation can be provided with advantage at the ring shoulder or at the transition of the rivet section and/or at the rivet section.

Although the provision of a flange on the functional element is advantageous in some applications, it is not absolutely essential. For example, the hollow body element can have a head section and a rivet section or internal forming section, with the head section having a jacket surface without a flange and merging via a contact surface into the rivet section or internal forming section at which the auxiliary joining part is in contact in the installed state, in which arrangement the auxiliary joining part should have a contact surface against which the component comes into contact.

A functional element arrangement of this kind makes it possible to use different known hollow body elements in the present form, i.e. without further modifications for the solution of the object underlying the invention. For example the so-called RSU element of the company Profil Verbindungstechnik GmbH & Co. KG can be used here. With such an arrangement features providing security against rotation are provided in the region of the rivet section or internal forming section, i.e. between the functional element and the auxiliary joining part. Further measures must then be taken in order to ensure a security against rotation relative to the component. This can, for example, be achieved in that an adhesive is used. Another possibility consists in providing features providing security against rotation at the jacket surface of the head section of the functional element, for example in the form of ribs extending in the axial direction of the element or in that the jacket surface is of polygonal shape or has a grooved or ribbed shape.

The auxiliary joining part is in many cases realised as a sheet metal part. This is a favourably priced possibility for manufacturing the auxiliary joining part and of realising a high-strength connection to the functional element, i.e. a high-strength connection of the functional element arrangement at the component.

The sheet metal part can be provided with a metallic and/or with a plastic coating, with the coating preferably consisting of a material which is corrosion-resistant relative to the material of the component and relative to the material of the functional element or its coating. Furthermore, the material of the functional element or any surface coating of the functional element that is provided should be corrosion resistant relative to the material or materials of the component.

As an alternative to the use of a sheet metal part for the auxiliary joining part this can also be a plastic part, for example in the form of a fibre reinforced plastic. This part can also, if required, be provided with a metallic coating (for example for decorative purposes or to ensure electrical conductivity) and this coating should then consist of a material which does not lead to any corrosion effects relative to the material or materials of the component and/or of the functional element.

That is to say that here, as also above, neither the auxiliary joining part nor the component or the functional element should corrode.

The auxiliary joining part is preferably formed as a plate-like part, the edge region of which forms a flange with a contact surface against which the component comes into contact and the dish of which is to be arranged in a ring recess or a stepped bore of the component, and the functional element should be capable of being riveted to the base of the dish.

Particularly favourable with this embodiment of the auxiliary joining part is that one can hereby obtain an adaptation to various component thicknesses without having to change the functional element. Instead of this, only the constructional height of the auxiliary joining part is adapted, depending on the component which is being used. Since such auxiliary joining parts can be made at favourable price and at short notice, for example as a mass production product in a pressing plant, it is substantially easier to change the auxiliary joining part than the functional element which normally requires special cold heading tools for its manufacture.

Instead of using a plate-like auxiliary joining part this can be formed as a flat disc, the edge region of which forms a contact surface against which the component comes into contact, with the functional element being capable of being riveted to the central region of the disc. Such discs also enable an adaptation to components of various thicknesses, and indeed in that they can be inserted into a stepped bore of the component and can come into contact against a ring shoulder formed by the stepped bore. By changing the position of the ring shoulder within the respective component, the respectively required adaptation to different components can be effected without having to change the design of the functional element.

Irrespective of whether the auxiliary joining part is formed as a plate-like part or as a disc, the base of the dish or of the central region of the disc can be pre-holed to receive a rivet section of the functional element. A pre-holing of this kind simplifies under some circumstances the attachment of the functional element and also facilitates the mutual centring of the functional element and of the auxiliary joining part. As an alternative to this, the base of the dish or the central region of the disc are not pre-holed but are rather first holed during attachment of the functional element by a piercing and riveting section of the functional element or by a preceding hole punch.

This embodiment enables the use, in accordance with the invention, of functional elements known per se or derived herefrom which are provided with a piercing and riveting section or are used with a preceding hole punch.

As already mentioned, the functional element and/or the auxiliary joining part can be provided at a surface region which enters into contact during the attachment to the component with this and/or with the other respective part (auxiliary joining part and functional element respectively) with an adhesive. This adhesive, which is preferably a dry adhesive, which serves on the exertion of pressure for an adhesive bond between the component and the functional element and/or between the component and the auxiliary joining part and/or between the functional element and the auxiliary joining part, can, on the one hand, serve for sealing of the functional element arrangement relative to the component can, however, on the other hand, also form the means or one of the means for producing a security against rotation.

Further embodiments of the means for producing this security against rotation can be derived from the claims 39 and 40.

Even if many of the functional elements known per se are suitable, optionally with a corresponding modification, for use with an auxiliary joining part for the attachment to a component, with various modifications being carried out if necessary, such a for example the introduction of an intermediate step and the subdivision of the function of providing security against rotation and the riveting function between different regions of the functional element, novel functional elements and/or auxiliary joining parts can also be conceived in order to satisfy the present objects. For example, a plate-like part can be used as an auxiliary joining part, the edge region of which forms a contact surface against which the component comes into contact, with this edge region being initially conically shaped and diverging in the direction of the dish of the plate-like part, with the dish of the plate-like part being designed to receive a rivet section of the functional element which can be received from the side of the edge region into the dish and with the rivet connection being brought about by pressing the edge region of the plate-like part flat. For this purpose, the rivet section of the functional element preferably has a slightly divergent shape in the region of its free end. It is particularly favourable in this embodiment when the edge of the plate-like part is interrupted at a plurality of points, since this facilitates the pressing flat or turning over of the edge region.

In a further alternative embodiment the auxiliary joining part can have the form of a tube section with a flange, with the functional element that is used being formed by a new element in the form of a hollow body element, fitting into the tube section and having oblique noses in an end region which, starting from the associated end of the hollow body element, extend along a part length of the hollow body in the direction of its other end and thereby reduce in their radial extent, with these noses deforming the tubular section in an end region and also the component on insertion into the tube section and with the hollow body element being dilatable at its other end for the interlock with the auxiliary joining part.

Furthermore, the present invention is concerned with respective functional elements for use in the functional element arrangements set forth here and with respective auxiliary joining parts which are likewise suitable for use in the functional element arrangements described here.

Moreover, the present invention is concerned with component assemblies in accordance with claim 46.

Finally, the present invention is concerned with a method for the attachment of a functional element to a component in accordance with one of the further claims 47 to 56.

Figure 3G:
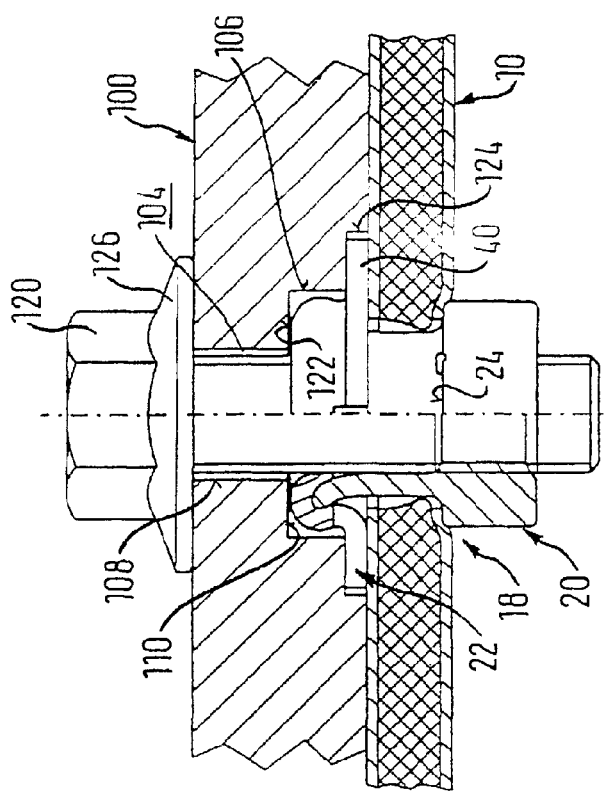
Figure 2G:
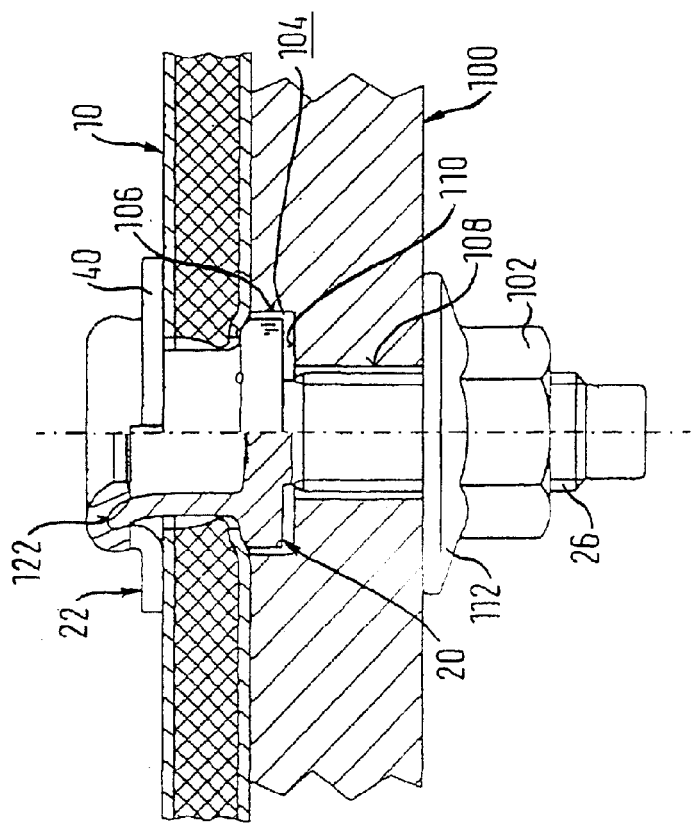
Figure 3E:
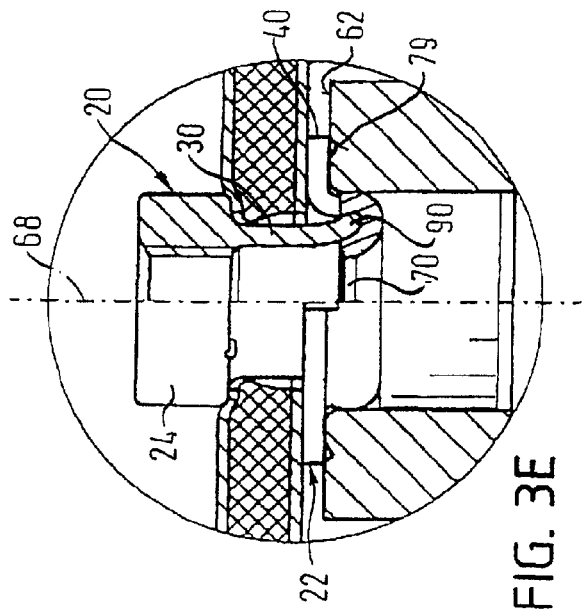
Figure 3F:
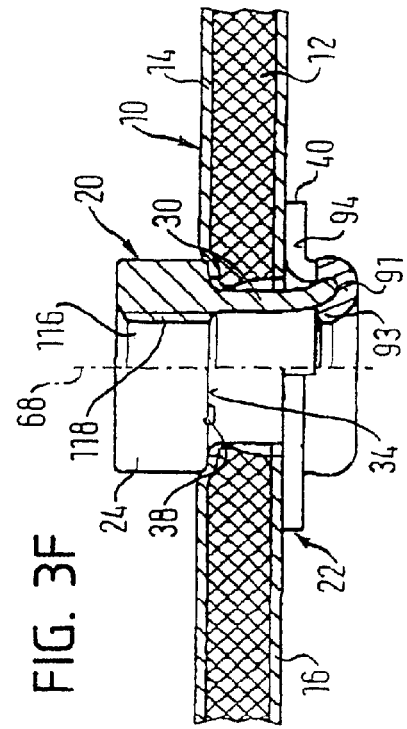
Figure 3D:
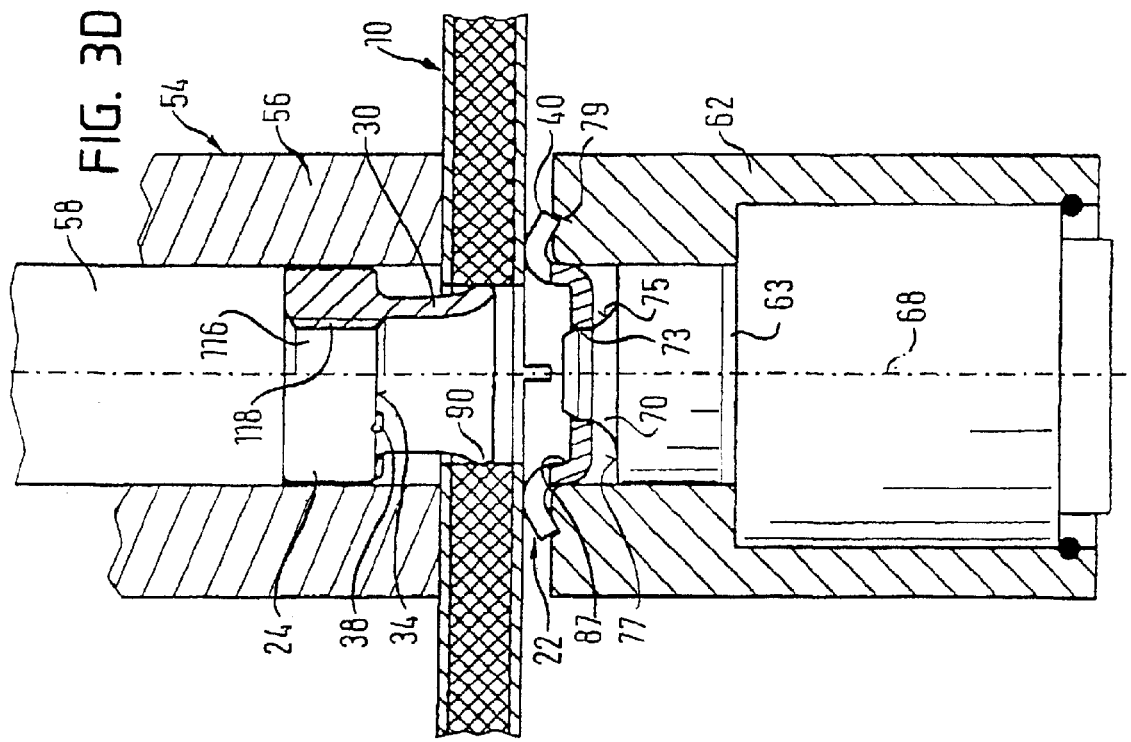
Figure 12A:
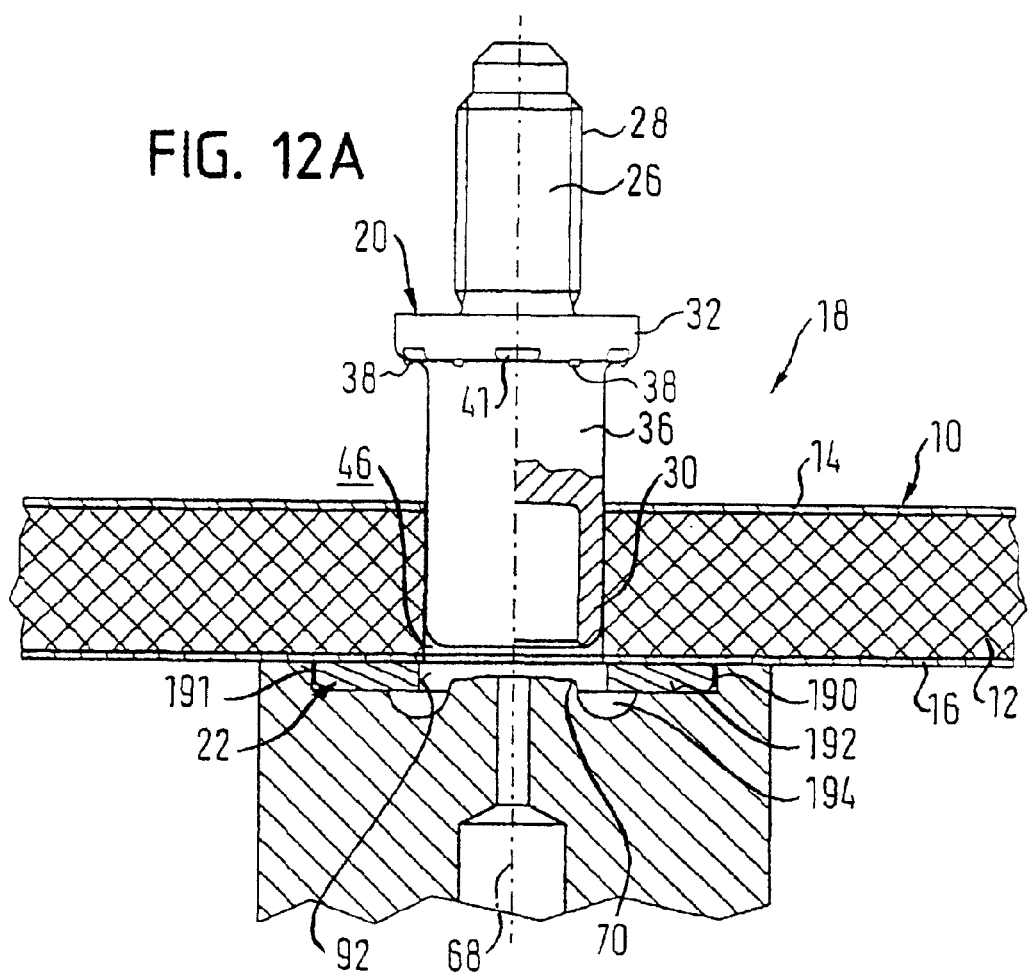
Figure 12B:
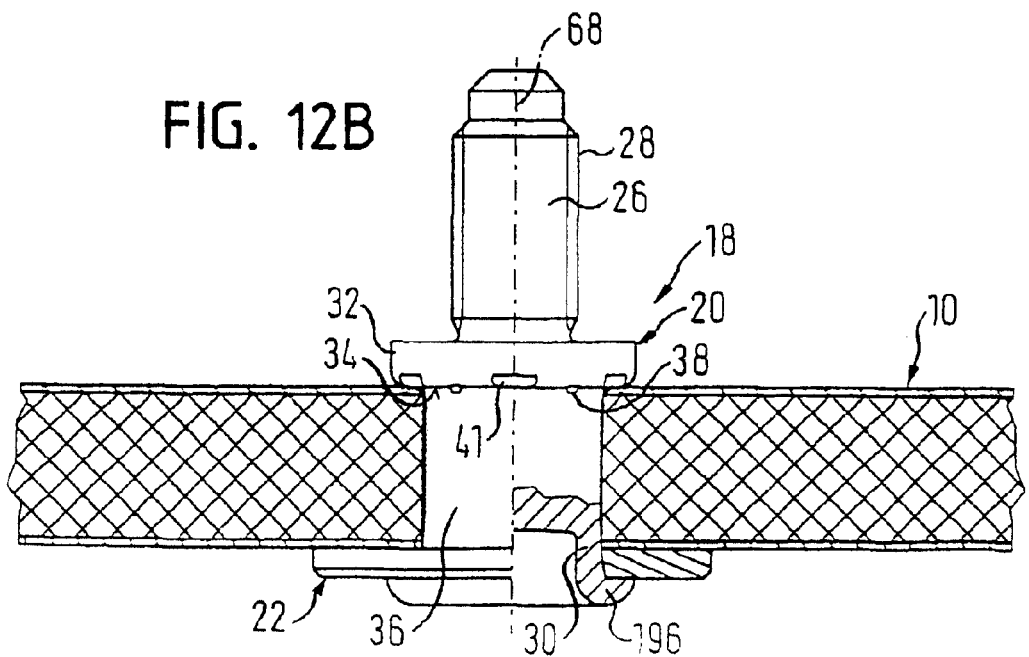
Figure 13A:
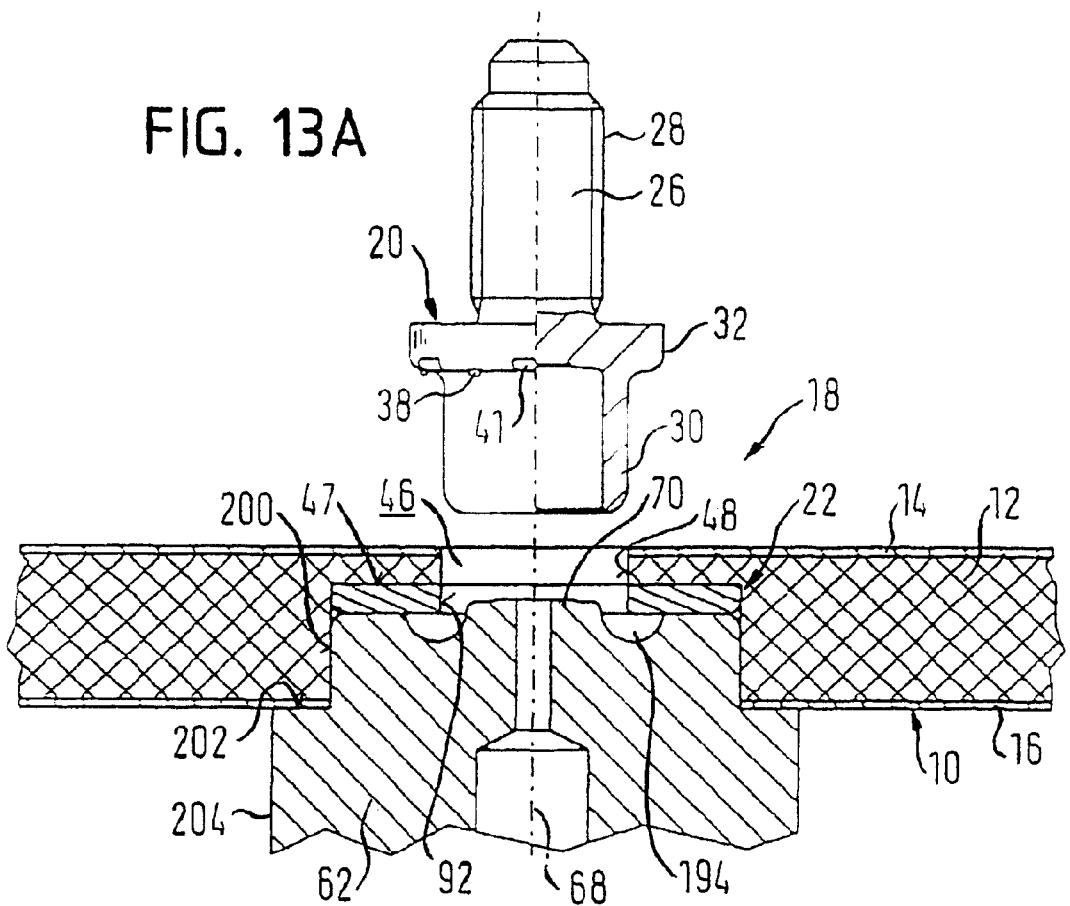
Figure 13B:
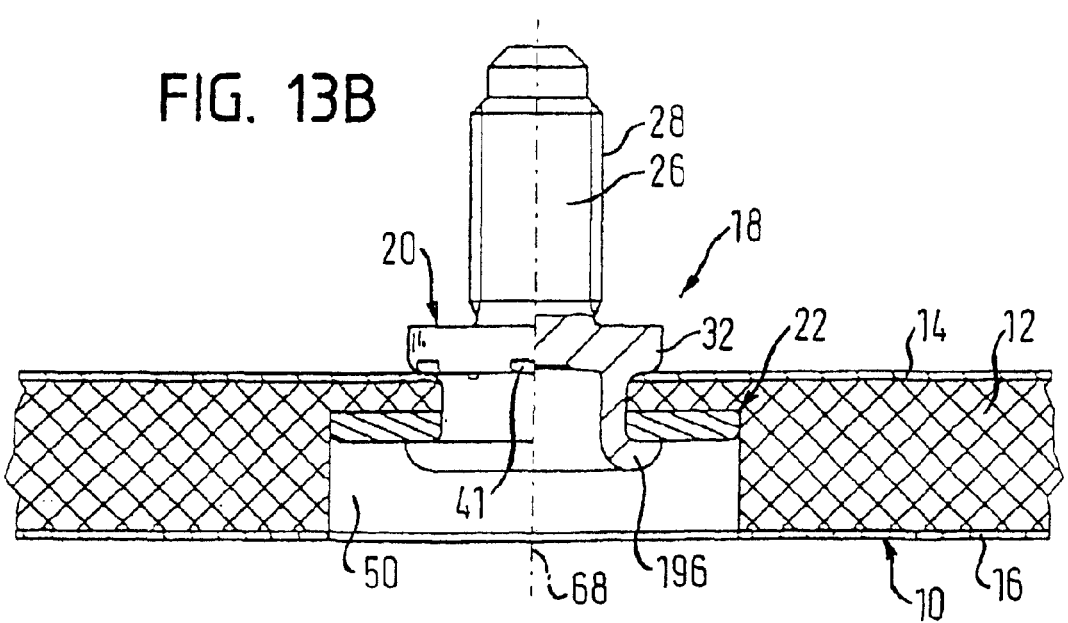

The invention will be explained in the following in more detail with reference to a series of embodiments and to the drawings which show:

FIG. 1 a functional element arrangement in accordance with the invention consisting of a functional element in the form of a slightly modified bolt element of the type SBF of the company Profil Verbindungstechnik GmbH & Co. KG, together with an auxiliary joining part in accordance with the invention during the attachment to a sandwich-like component, the individual FIGS. 1A–1E showing various stages of the attachment process, FIG. 2 a representation of a further modified embodiment of a bolt element of the type of the above mentioned SBF bolt for the attachment to a sandwich-like component, with FIGS. 2A–2G showing the following:

FIG. 2A the bolt element partly sectioned in the longitudinal direction,

FIG. 2B an axial section through the auxiliary joining part of the invention for use with the bolt element of FIG. 2A, FIG. 2C a plan view of the auxiliary joining part of FIG. 2B, FIG. 2D the starting stage of the attachment of the functional element and auxiliary joining part to the component, FIG. 2E the end stage of the attachment of the bolt element and of the auxiliary joining element to the component, FIG. 2F the finished component assembly, and FIG. 2G the component assembly of FIG. 2F with a further component screwed thereto, FIG. 3 a representation of a functional element in the form of a modified embodiment of a nut element in the manner of the RSF element of the company Profil Verbindungstechnik GmbH & Co. KG for the attachment to a sandwich-like component, with the FIGS. 3A–3G showing the following:

FIG. 3A the nut element partly sectioned in the longitudinal direction,

FIG. 3B an axial section through the auxiliary joining part of the invention for use with the nut element of FIG. 3A, FIG. 3C a plan view of the auxiliary joining part of FIG. 3B, FIG. 3D the initial stage of the attachment of the functional element and auxiliary joining part to the component, FIG. 3E the end stage of the attachment of the nut element and of the auxiliary joining part to the component, FIG. 3F the finished component assembly, and FIG. 3G the component assembly of FIG. 3F with a further component screwed thereto, FIG. 4A a sketch to illustrate the attachment of a functional element in accordance with the invention in the form of a modified EBF bolt element of the company Profil Verbindungstechnik GmbH & Co. KG to an auxiliary joining part formed in accordance with the invention, with the functional element arrangement being sectioned partly in the longitudinal direction, FIG. 4B the auxiliary joining part provided in accordance with the invention partly sectioned in the longitudinal direction and shown on its own for use with the bolt element of FIG. 4A, FIG. 4C a sketch similar to FIG. 4A after the closing of the press used for the attachment of the functional element, and FIG. 4D the finished component assembly in accordance with FIG. 4C after removal from the press, FIG. 5 a functional element arrangement in accordance with the invention consisting of a nut element formed in accordance with the RSU element of the company Profil Verbindungstechnik GmbH & Co. KG and an auxiliary joining part in accordance with the invention for the attachment to a sandwich-like component, with the FIGS. 5A–5E representing various phases of the attachment to the plate-like component, FIG. 6 a sequence of drawings in accordance with the FIGS. 5A–5E but with a modified embodiment of a nut element in accordance with the invention, FIG. 7 a series of drawings similar to FIGS. 5A–5E for representation of the attachment of a further functional element in accordance with the invention in the form of a modified RSU nut element, with FIGS. 7A, 7C to 7F showing the same stages of the attachment process as FIGS. 5A to 5E, and FIG. 7B showing an end view of the nut element of FIGS. 7A, FIG. 8 a sequence of drawings corresponding to the FIGS. 5A to 5E, but for the representation of the use of the functional element in accordance with the invention in the form of a nut element similar to the RND element of the company Profil Verbindungstechnik GmbH & Co. KG, FIG. 9 a sequence of drawings similar to the series of drawings of FIGS. 7A to 7F, but to show the use of a functional element in the form of a modification of the RND element, FIG. 10 a series of drawings of a functional element arrangement in accordance with the invention with a nut element corresponding to the RSU element of the company Profil Verbindungstechnik GmbH & Co. KG, however, with an auxiliary joining part in accordance with the invention with the special feature that the nut element and auxiliary joining part are jointly introduced from one side of the component into the latter, with the FIGS. 10A to 10E showing various stages of the attachment process, FIG. 11 a further functional element arrangement in accordance with the invention with a new nut element and an auxiliary joining part in accordance with the invention which is designed significantly differently from the previous embodiments, with the nut element and the auxiliary joining part also being introduced in accordance with FIG. 11A from the same side of the component into the latter and with the individual drawings of FIGS. 11C to 11F showing various stages of the attachment process, whereas FIG. 11B shows an end view of the nut element in accordance with the invention, FIG. 12A a further functional element arrangement in accordance with the invention consisting of an SBF-like element as the functional element and a flat disc as auxiliary joining part, with the die arrangement used for the attachment of a functional element arrangement to the component being shown partially sectioned in the axial direction, and FIG. 12B represents the component assembly after carrying out the riveting process, FIG. 13A a representation similar to FIG. 12A in which, however, the flat disc is arranged in a stepped bore of the component and the functional element that is used has a strong similarity to an SBF bolt, with the die that is used here during the attachment of the functional element arrangement also being shown in a view sectioned in the longitudinal direction, and FIG. 13B shows the finished component assembly, and FIG. 14A a drawing similar to FIG. 13A but using a functional element in the form of an RSF element of the company Profil Verbindungstechnik GmbH & Co. KG, with the die that is used here during the attachment of the functional element arrangement also being shown in a view sectioned in the longitudinal direction and FIG. 14B represents the finished component assembly.

For the various variants of the invention which will be explained in the following the same reference numerals will be used for the same part or parts which satisfy the same function. It is expressly pointed out that the description used for individual parts or for features of parts also applies to other parts or features with the same reference numeral unless something contrary to this is expressly stated.

With reference to FIG. 1 a component is identified by 10 which is here present in a sandwich construction and consists of a core 12 with upper and lower covering layers 14 and 16. The core 12 can, for example, be a metal foam, for example of aluminium or of an aluminium alloy, whereas the covering layers 14 and 16 can consists of thin metal sheets of aluminium or of an aluminium alloy or of different aluminium alloys or of steel or different materials bonded to the metal foam plate 12 and can have, for example, a respective thickness in the range from 0.5 to 3 mm. In total, the component 10 can have a thickness which straightforwardly lies in the range from 2.5 to 50 mm or more.

Although the component 10 is shown in all the following Figures, the component 10 can have any desired construction in accordance with the statements made in the introduction to the specification in relation to the different components which can be equipped in accordance with the invention with functional element arrangements.

In general, such components will be significantly thicker than the sheet metals normally used in coachwork construction, i.e. thicker than 2.5 mm. They will normally also have a compressive strength which is significantly lower than sheet metals of the same or of comparable materials, so that, for at least some of the subsequently described embodiments, a pronounced deformation of the component is associated with the attachment of the functional element arrangement.

The plate-like component 10 can, however, also consists of thick components of metal, plastic, woods or other materials which will either hardly be deformed or which will undergo a considerable deformation during the attachment of the functional element arrangement.

Even though the component 10 is shown as a plate-like component, it can entirely also relate to wall regions of three-dimensional articles which need not necessarily be understood as panels, but can, for example, be present as filled hollow sections, cast parts, injection moulded parts, or otherwise manufactured parts.

FIG. 1 is concerned with the attachment of a functional element arrangement 18 consisting of a bolt-like element 20 and an auxiliary or joining part 22. The bolt-like element 20 represents a modified SBF element of the company Profil Verbindungstechnik GmbH & Co. KG and has a head part 24 and a shaft part 26, here with a thread 28, with only a part of the length of the shaft part 26 being shown.

The SBF element is, for example, described in U.S. Pat. No. 4,555,838 and in the U.S. Pat. No. 4,459,073. The SBF element and the method for the attachment of the element is moreover precisely set forth in the U.S. Pat. No. 4,543,701 and in the U.S. Pat. No. 4,727,646. The SBF element is used here in modified form. The head part 24 of the functional element 20 has a piercing and riveting section 30 at its end remote from the shaft part 26 which is designed precisely in accordance with the above mentioned US patents, particularly in accordance with U.S. Pat. No. 4,555,838. At its end adjacent to the shaft part 26, the head part 24 has a flange 32 with a contact surface 34 which, in the installed state, comes into engagement against the covering layer 14 of the component 10.

In distinction to a customary SBF bolt, the element 20 of FIG. 1 has an intermediate step 36, the axial length of which is so selected in order to enable the attachment in the relatively thick component 10 and to the auxiliary joining part 22 in the manner which will be explained in the following.

In a customary SBF bolt features of shape which are intended to provide security against rotation relative to the sheet metal part during the attachment of the element are located in the side of the flange 32 remote from the shaft part 26. In this embodiment similar features of shape are also present, they are, however, made somewhat more pronounced here in order to ensure an adequate security against rotation in the generally yielding component. These features of shape have in this embodiment the shape of noses which are located in the transition between the contact surface 34 and the intermediate step 36 and which extend in raised from in the radial direction along the contact surface 34 and in raised form in the axial direction along the intermediate step 36.

The auxiliary joining part 22 consists of a plate-like sheet metal part, here shown in a turned over orientation with a planar edge region 40 and a dish 42 which merges into a through-going base region 44 which extends parallel to the circular ring-like edge region 40 and is here not pre-holed.

For the reception of the functional element arrangement 18 consisting of the functional element 20 and the auxiliary joining part 22 the component 10 is pre-holed, and indeed pre-drilled in this example, and provided with a stepped bore 46 with a first section 48 of smaller diameter and a second section 50 of larger diameter, with the section 48 merging via a ring shoulder 52 into the section 50. The diameter of the section 48 corresponds at least substantially to the outer diameter of the intermediate step 36 and has approximately the same length as the latter, whereas the diameter of the section 50 corresponds at least substantially to the outer diameter of the base region 44. The axial length of the section 50 corresponds at least substantially to the height of the auxiliary joining part 22 less the sheet metal thickness.

Figure 1B:
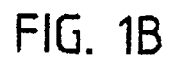

For the attachment of the functional element arrangement 18, the functional element 20 is inserted into a setting head 54 which is, for example, shown in FIG. 1B and which includes a hold-down member 56 and also a plunger 58, with the plunger having a centrally arranged bore 60 to receive the shaft part 26 of the element 20. Beneath the component 10, there is located a die 62 with a cylindrical shape which is let into a corresponding bore 64 of a tool 66.

This is, as usual in the attachment of fastener elements, a setting head 54 which is arranged at the upper tool of a press or in an intermediate plate of the press, whereas the tool 66 is the intermediate plate of the press or the lower tool of the press. An inverse arrangement would also be possible in which the setting head 54 is attached to the lower tool of the press or to an intermediate plate of the press, whereas the die 62 is then located at the intermediate plate or at the upper tool of the press respectively.

It is also in no way essential to use a press for the attachment of the functional element arrangement. For example, a robot could be used in a manner known per se, for example in accordance with the European patent 0 691 900, with the die and the setting head then being carried by the robot. However, a percussion tool or other tools could also be used for the attachment of the functional element arrangement to the component, for example a tool in accordance with one of the following protective rights DE-PS 197 47 267, EP 0 890 397 or DE-PS 197 01 088.

At this point it should be brought out that it would also be conceivable to realise the auxiliary joining part 22 not as a sheet metal part, but rather as a plastic part, for example with fibre reinforcement. Also both the functional element and also the auxiliary joining part 22 can be provided with one or more protective coatings which ensure that no impermissible corrosion arises between the functional element and the component or between the auxiliary joining part and the component and between the functional element and the auxiliary joining part. All surfaces of the functional element 20, which come into contact with the component 10 and/or with the auxiliary joining part 22 and also all surfaces of the auxiliary joining part 22 which come into contact with component 10 and with the functional element 20, can be provided with an adhesive, preferably with a dry adhesive, which is activated under pressure during the attachment of the functional element arrangement and preferably bonds together in watertight manner all the surfaces of the functional element 20, of the component 10 and of the auxiliary joining part 22 which come into contact with one another. This adhesive bond also ensures a high security against mutual rotation. The adhesive layer thus forms a device providing security against rotation.

As can be seen from FIG. 1B the setting head and the die are axially aligned relative to one another and relative to the stepped bore 46 of the component during the attachment of the functional element arrangement, so that the functional element 20, the auxiliary joining part 22 and the stepped bore 46 all lie on a common longitudinal axis 68 and are thus aligned with one another.

It is, for example, also evident from FIG. 1B that the die 62 is set back over the tool 66 in the axial direction, i.e. in the direction of the axis 68, to such an extent that the upper side of the edge region 40 of the auxiliary joining part 22 lies at least substantially flush with the upper side of the tool 66.

It is also evident from FIG. 1B that the die 62 has a coaxial, cylindrically shaped projection 70, which is received in the recess 42 of the auxiliary joining part, more precisely stated in the receiving space 72 of the dish 42. The end face of the projection 70 of the die is provided with a ring-like, rounded forming surface 74 which has at least substantially the shape which is described in the above named U.S. Pat. No. 4,727,646.

Furthermore, one notes from FIG. 1B that the transition between the shaped projection 70 of the die and the horizontally extending contact surface of the die 62 in FIG. 1B for the lower side of the auxiliary joining part 22 is realised with a rounded, small undercut 78 which ensures that the auxiliary joining part is not injured during the attachment of the latter and that the auxiliary joining part and the die do not stick too strongly to one another after carrying out the piercing and riveting process.

Figure 1C:
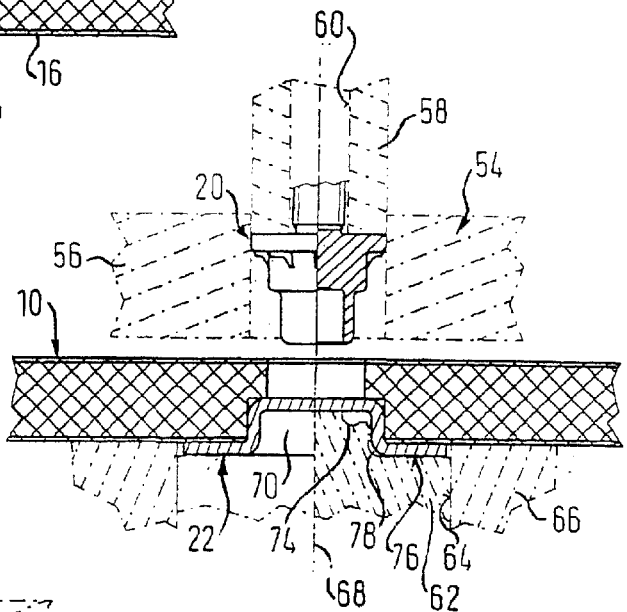

FIG. 1C now shows a further phase of the attachment of the functional element arrangement to the component 10. As can be seen there, the component 10 is now pressed by the hold-down member 56 against the upper side of the lower tool 66 and against the upper side of the edge region 40 of the auxiliary joining part 22 shown in FIG. 1C, so that the component is held firmly under the pressure of the hold-down member. The plunger 58 has now moved through the closing movement of the press downwardly sufficiently far that the end face of the piercing and riveting section 20 of the functional element 20 has entered into contact with the upper side of the base region 44 of the auxiliary joining part 22.

Figure 1D:
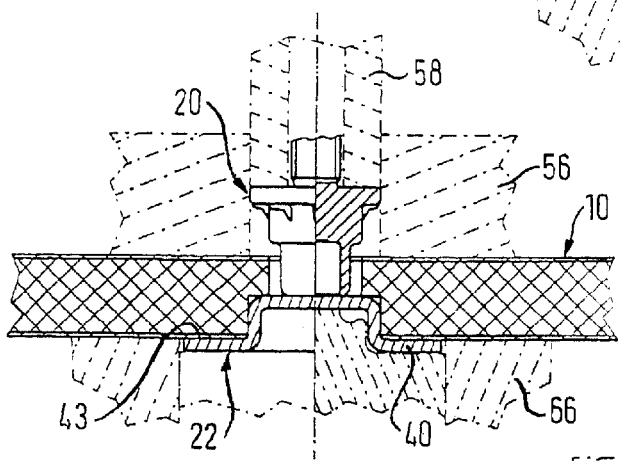

Through a further closing movement of the press this base region is now pierced by the piercing and riveting section 30, as shown in FIG. 1D. The piercing and riveting section is reformed into a peripherally extending rivet bead 80, with the edge of the pierced base region 44 of the auxiliary joining part being held trapped between the rivet bead 80 and the ring shoulder 82 at the transition of the piercing and riveting section 30 into the intermediate step 36 and also being correspondingly deformed. At this point, a rivet connection arises in accordance with the usual rivet connection with an SBF element, but with the distinction that the rivet connection is formed between the rivet bead 80 and the ring shoulder 82 of the intermediate step 36, rather than between the rivet bead 80 and the lower side of the flange part 32.

One can see from FIG. 1D and also from FIG. 2E, which shows the component assembly, that the noses 38 providing security against rotation have been pressed into the upper covering layer 14 of the component 10 and have also correspondingly deformed the core region 12, so that these noses provide an additional device providing security against rotation (additional to the adhesive bond—if present) and ensure an additional security against rotation.

The piercing slug 82 which arises on piercing the base region 44 of the auxiliary joining part 22 by the riveting and punching section 30 is kept trapped, as is usual with an SBF bolt element, within the piercing and riveting section and also serves to support the rivet bead, whereby a high-strength connection arises.

Figure 1E:
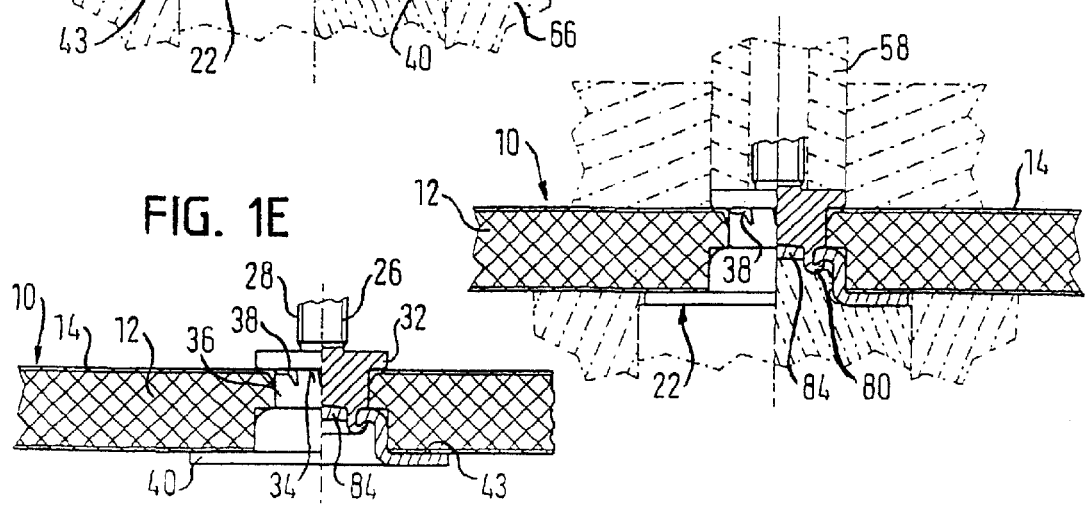

In use of the finished component assembly in accordance with FIG. 1E another component is secured to the upper covering layer 14 of the component 10, and indeed by a nut which is screwed onto the thread 28 of the shaft part 26. This is not shown in FIG. 1, but is, however, described in connection with FIG. 2G which shows a similar component assembly.

It is evident from FIG. 1 that the auxiliary joining part 22 is kept against being lost during attachment by the die arrangement, on the one hand by the recessed arrangement of the die within the lower tool 66 and, on the other hand, by the shaped projection 70 which is located in the receiving space 72 of the auxiliary joining part 22. This arrangement also serves for intimate contact of the rim-like region 40 against the lower covering layer 16 of the component 10. It can also clearly be seen from FIG. 1D that the degree of crushing of the component 10 is precisely determined during the attachment of the functional element arrangement by the preset height of the intermediate step 36 and of the dish 42, i.e. by the spacing between the flange 32 and the edge region 40 of the auxiliary joining part which likewise forms the flange. The arrangement is so contrived that the forces which prevail during attachment in a press are sufficient in order to bring about the connection in accordance with FIG. 1E, but are not, however, so large that the functional element arrangement or the auxiliary joining part experiences a deformation which goes beyond this.

A special advantage of the functional element arrangement of FIG. 1 is to be seen in the fact that the loading of the component 10 in operation, during the screwing on of a further component, acts on the component 10 via the large area edge region 40 of the auxiliary joining part. This surface can be made adequately large, so that the maximum permissible surface pressure is not exceeded.

A further particular advantage of this arrangement lies in the fact that one can cover a wide range of different component thicknesses with one element, since it is only necessary, with different component thicknesses, to provide auxiliary joining parts which have a different height, whereas the more complex functional elements 20 can remain the same. For the use with plate-like auxiliary joining parts 22 of different height, correspondingly designed dies are naturally also required, i.e. dies with a corresponding height of the shaped projection 70. Moreover, the axial length of the bore section 50 must be correspondingly selected.

Not shown in FIG. 1, but nevertheless entirely possible, would be to arrange the die 62 at the lower tool 66 so that the surface 76 lies flush with the surface of the lower tool 66 and to select the dimensions such that the edge region 40 of the auxiliary joining part 22 does not form any recess in the lower side of the component 10 during the attachment to the functional element, so that the lower side of the auxiliary joining part 22 is flush with the lower covering layer 16 of the component 10, or indeed slightly recessed relative to this surface. In this manner, the receiving space 72 can be filled with a filler and the edge region 40 if required covered over with a filler, so that, after manufacturing and painting of the component, a smooth, continuous surface results at the lower covering layer 16 at the position of the auxiliary joining part.

With reference to FIG. 2 a functional element arrangement will now be described which is very similar to the functional element arrangement of FIG. 1, which has undergone certain modifications.

The functional element 20 of FIG. 2A is also realised here similar to an SBF bolt element, but the piercing and riveting section 20 is used only as a riveting section and for this purpose deformed in the region of its end into a conically divergent ring region 90. The functional element 20 lacks in this example the intermediate step 36 of FIG. 1, however, the element in FIG. 2A could optionally also be formed with such an intermediate step. In other respects the features 38 providing security against rotation are executed here in the contact surface 24 in precisely the same way as in a customary SBF bolt. They could, however, also be executed in the same way as the features 38 providing security against rotation in accordance with FIG. 1.

The auxiliary joining part 22 is, in this example, likewise of plate-like shape with a ring-like edge region 40, a dish 42 and a receiving space 72, but is, however, used here in a position inverted with respect to FIG. 1. It should be noted in this example that the auxiliary joining part 22 has a hole 92 arranged in the base region 44 at the centre and that the ring-like edge region 40 is angled downwardly in the direction of the base region 44 while conically diverging and is interrupted at several points (in this example at four points) by slots 94 which extend over a part of the side wall of the dish 42. The auxiliary joining part 22 is preferably a sheet metal part and represents a typical punched part, i.e. the corresponding shape including the hole 92 and the slots 94 is manufactured in a punching process from a sheet metal panel or from a strip of sheet metal.

FIG. 2C shows an auxiliary joining part 22 in a plan view from above.

For the attachment of the functional element arrangement of FIG. 2A to FIG. 2C a setting head 54 and a die 62 are also used here, with the die 62 being usually inserted into a lower tool of a press, which is not, however, shown in the illustration of FIG. 2D. The possibility also exists here of inserting the functional element arrangement with a robot or with a percussion tool or otherwise.

The setting head 54 consists in this example likewise of a hold-down member 56 and a plunger 58. The die 62 has a central part 63 with a shaped projection 70 with a chamfered end 71, a cylindrical region 73, which is located within the hole 92 and centres the latter and with a radius 75 which merges into a planar support surface 77 standing perpendicular to the longitudinal axis 68 and supporting the lower side of the base region 44 of the auxiliary joining part 22 during the attachment of the element.

The die 62 of FIG. 2D also has a peripherally extending ring groove 79 with inclined inner and outer walls, the shape of which are substantially matched to the shape of the lower edge 81 of the edge region 40 of the auxiliary joining part 22, however—as be seen from FIG. 2D—the axial depth of the ring recess 79 is selected to be significantly smaller than the sheet metal thickness of the auxiliary joining part 22.

As is likewise evident from FIG. 2D, both the shaped projection 70 and also the ring recess 79 and the cylindrical bore 83 of the outer part 62 of the die 62 serve for the centring of the auxiliary joining part 22 during its attachment.

FIG. 2D shows the attachment of the functional element arrangement after the press has been closed sufficiently far that the hold-down member 56 presses the component 10 against the ring-like surface 85 of the auxiliary joining part 22.

During the full closing of the press the conically outwardly set mouth region 90 of the rivet section 30 is pressed into the corner region 87 of the auxiliary joining part and, as can easily be seen from FIG. 2E, the edge region 40 of the auxiliary joining part 22 is bent upwardly, so that this edge region 40 now lies flush on the end face of the outer die 62, i.e. in a plane perpendicular to the longitudinal axis 68. The inner part 63 of the die is also displaced slightly upwardly during the closing movement of the press, so that the end face of the shaped projection 70 now lies slightly higher than the upper end face of the outer die 62. The dies 62 is thus a so-called telescopic die, the outer part of which is biased upwardly or the inner part of which is biased downwardly, with the die first being brought into the position of FIG. 2E during full closing of the tooling or the press. Such telescopic dies are known in other shapes for other purposes.

Through the reforming of the edge region 40, the auxiliary joining part and through the simultaneous forming of the base region 44 of the auxiliary joining part 22 the conically outwardly deformed ring region 90 of the functional element 68 is held in shape-matched and force-transmitting manner in the auxiliary joining part, so that the functional element 20 and the auxiliary joining parts 22 can no longer be separated from one another with a normal exertion of force. The slots 94 make it easier to reform the edge region 40, both during the manufacture of the auxiliary joining part 20 and also during the pressing flat of the edge region 40 during the attachment of the functional element arrangement. During this pressing flat, the regions 95 of the ring wall of the recess 42 are deformed or moved radially inwardly.

FIG. 2F shows the component assembly consisting of the functional element arrangement 18 (20+22) and the component 10 after the removal of from the press. Here it can clearly be seen that the features 38 providing security against rotation have pressed locally into the upper cover layer 14 of the component in the region of the contact surface 34 of the flange 32, with the core region 12 of the component 10 also being partly deformed here, and thus have ensured the required security against rotation. The functional element 20 and/or the auxiliary joining part 22 are also preferably provided here with an adhesive layer in order to ensure an increased security against rotation.

It can also be clearly seen from the region at the bottom right of FIG. 2F how the conically diverging end region 90 of the rivet section 30 is held trapped in a rounded, ring-like groove 91 which is kept trapped between the upwardly bent, radially outwardly deformed edge region 93 of the hole 92 and the radially inwardly deformed side edge 95 of the dish 42.

FIG. 2G now shows the component assembly in accordance with FIG. 3F in an application in which a further component 100 is secured to the first named component 10, and indeed by means of a nut 102 which is screwed onto the shaft part 26 of the functional element 20. The component 10 has a stepped bore 104 with a section 106 of larger diameter which is selected to be fractionally larger than the outer diameter of the flange 32 of the functional element 20 and with a section 108 of smaller diameter, with the diameter of the section 108 being only fractionally larger than the outer diameter of the shaft part 26.

The ring shoulder 110 located between the bore section 106 and the bore section 108 has in the installed state a spacing from the side of the flange adjacent the shaft part, so that the further component 100 has an intimate contact with the first named component 10. That is to say that the first named component 10 and the further component 100 are pressed together, and indeed between the edge region 40 of the auxiliary joining part 22 and a flange part 112 of the nut 102. These parts can be selected to be sufficiently large area-wise, that the maximum permissible surface pressure between the first and second components 10, 100 is taken into account.

The compression forces which act on the components are transmitted as axial tension forces in the functional element 20 between the nut 102 and the auxiliary joining part 22.

FIG. 3 now shows a further functional element arrangement in accordance with the invention which is in many respects similar to the functional element arrangement of FIG. 2, however, the functional element 20 is here formed as a hollow element, namely as a nut element.

The rivet section 30 of the nut element corresponds fully to the rivet section 30 of the bolt element of FIG. 2A and merges in precisely the same way into the contact surface 34. This surface is provided with radially extending noses 38 and grooves lying between them which, in the installed state of the functional element, form a security against rotation. These radially extending noses 38 can be identical to the noses 38 of FIG. 2A providing security against rotation or they can have a different shape.

The body or head section of the functional element 20 corresponds in diameter to the flange part 32 of the functional element 20 of FIG. 2A is, however, made substantially longer in the axial direction and provided with a centrally arranged bore 116 which carries an internal thread 118.

Instead of carrying an internal thread 118, the hollow body element can also be designed for use with a thread forming or thread cutting screw or the internal thread can be subsequently cut or formed after attachment of the elements using a corresponding tool. This also applies to all the other hollow elements described herein.

The auxiliary joining part 22 in accordance with FIGS. 3B and 3C is identical to the auxiliary joining part 22 in FIGS. 2B and 2C.

The attachment of the functional element arrangement of FIGS. 3A to 3C to a component 10 is shown in FIGS. 3D to 3F. The arrangements shown there and the way the attachment is carried out correspond extensively to the arrangement and way of attachment of FIGS. 2D to 2F and will not be newly explained here. It is sufficient to point out that the plunger can be formed here as a solid plunger, since a central bore to receive the shaft part of the functional element 20 is not necessary here, since the functional element 20 does not have any shaft part.

FIG. 3G shows a further component 100 which is screwed to the first named component 10 when using the functional element arrangement 18 of FIGS. 3A to 3F. The arrangement is inverted relative to the arrangement of FIG. 2G in the sense that the component 100 is attached to the side of the component 10 where the auxiliary joining part 22 is located. Since the functional element 20 is a nut element, a screw 120 is used for the attachment of the further component 100 to the component 10. In this embodiment the further component 100 also has a stepped bore 104 with a region 106 of larger diameter which receives the base region of the plate-like element 108 and between them a ring shoulder 110 which, in this example, can contact directly against the ring shoulder 122 of the auxiliary joining part 22, since one in this way increases the strength of the connection further. It is, however, not absolutely essential that the ring shoulder 110 is in contact with the auxiliary joining part. The bore section 106 is itself formed as a stepped bore with a region 124 which receives the edge region 40 of the auxiliary joining part 22. Here, the further component 100 also lies intimately against the first named component 10. Both components are loaded in compression, on the one hand by the contact surface 24 of the hollow body element 20 and, on the other hand, by the flange part 126 of the bolt 120.

FIGS. 4A to 4D now show a further functional element arrangement in accordance with the invention, and indeed also here with a functional element 20 in the form of a bolt element and an auxiliary joining part 22 (FIG. 4B) with a generally plate-like shape. The bolt element 20 is in this example a modified version of the so-called EBF bolt of the company Profil Verbindungstechnik GmbH & Co. KG which is described in the European patent 678 679 in detail, whereas at this point reference should also be made to the PCT application PCT/EP96/04188 (WO 97/11811) which contains special explanations in conjunction with the attachment of EBF bolts in thin metal sheets.

With the functional element 20 of FIG. 4A the bolt element also has a head part 24 and a shaft part 26, which is also provided here with a thread.

With a conventional EBF bolt element the rivet connection between the sheet metal part and the element arises in that the sheet metal part is provided with a ring collar-like region, characterised by 130 in FIG. 4B, the shaft part 26 of the element is inserted through the ring collar 130, and indeed in the direction of the arrow 132 in FIG. 4B and in that the ring collar is subsequently deformed in the radial direction against the so-called external forming section of the element, so that it engages into the thread 38 of the bolt element directly below the contact surface of the bolt element and brings about a firm connection. In this arrangement the bolt element, i.e. the EBF bolt, has in the external forming section, in the transition from the underside of the head part into the actual contact surface a ring-like recess around the shaft part. This is subdivided by noses providing security against rotation which have approximately the shape of the noses 38 of FIG. 1 and extend in the radial direction within the ring-like recess of the contact surface and in the axial direction in raised form along the shaft part of the bolt element. The ring-like recess in the contact surface has a side wall which extends parallel to the axis of the bolt element and which, so to say, forms a continuation of the jacket surface of the shaft part of the element and an inclined surface which forms a conical ring wall. The die used for the attachment of the element is shown at 62 in FIGS. 4A and 4C and has a ring-like projection in a customary EBF bolt which presses the sheet metal part into the ring-like recess in the contact surface with an inclined inner wall which presses the ring collar against the thread and deforms it into the latter. During this deformation of the ring collar region of the sheet metal part, the noses providing security against rotation are pressed into the sheet metal part and thus satisfy the desired function of providing security against rotation. In other words, the rivet connection to the sheet metal part takes place here in the riveting section referred to as an external forming section.

The region of the functional element 20 of FIG. 4C below the line 134 corresponds at least substantially completely to a customary EBF bolt. The attachment to the auxiliary joining part 22 corresponds fully to the attachment of the customary EBF bolt to a sheet metal part, with the sheet metal part 22 here having the sheet metal preparation customary with an EBF bolt in the region of the base surface 44, in particular the ring collar 130. The other respects, the auxiliary joining part 22 has the same plate-like design as the corresponding auxiliary joining part 22 of FIG. 1A.

The die 62 that is used has a ring-like recess 75 at its upper end which forms a support surface 76 which comes into contact at the lower side of the edge region 40 in FIG. 4B and has an axial depth relative to the ring shoulder 77 which corresponds to the sheet metal thickness of the auxiliary joining part 22. Moreover, the die 62 has a shaped projection 70 which carries the above mentioned ring projection 63. The die 62 of FIGS. 4A and 4C is likewise arranged in a tool (not shown) in accordance with the die 62 of FIG. 1B.

Above the said plane 134 the head region of the functional element 20 of FIG. 4A is extended upwardly somewhat so that an intermediate step 36 is produced. This intermediate step 36 then merges into a flange 32 which is provided with noses 38 providing security against rotation in accordance with FIG. 1A. These noses providing security against rotation can also have a different shape, for example the shape of noses which extend solely in the radial direction at the contact surface 34.

The intermediate step 36 of FIG. 4a has a centrally arranged recess 136 which is provided for weight saving reasons. This recess 136 can, however, also be formed as a spanner socket, for example in the manner of a socket head cap screw, so that on screwing a nut onto the shaft part 26 an increased security against rotation can be generated. In this embodiment all surfaces of the functional element 20, which come into contact with the component 10 or with the auxiliary joining part 22 as well as all surfaces of the auxiliary joining part 22 which come into contact with the component 10 and/or with the functional element 20, can be provided with an adhesive which either alone or in combination with other features of shape, such as 38 (if present), take care of the desired security against rotation.

The way the element is attached corresponds fully to the method described in the European patent (or in the WO document), so that the methods not need to be explained further here.

The previously discussed advantages of the positive alignment of the auxiliary joining part 22, of intimate contact of the edge region 40 of this auxiliary joining part at the component 10 and the controlled installation conditions, so that the spacing between the flange 32 and the edge region 44 on attachment of the functional element arrangement is precisely matched to the respective component 10 on attachment of the functional element arrangement through the axial height of the intermediate step 36 and of the dish apply here as described in connection with FIG. 1.

After completion of the component assembly in accordance with FIG. 4C and removal from the die, the component assembly is as shown in FIG. 4D and a further component can now be screwed to the lower side of the first named component 10 in FIG. 4D, with the component which has to be screwed into place having to have a stepped bore, so that it intimately contacts the first named component 10.

The compression forces on the component 10 and on the further component (not shown) are produced in this example between the flange 32 of the functional element 20 and the nut which is to be screwed onto the shaft part 26 of the functional element 20 and causes a tensile load in the functional element 20.

FIG. 5 now shows a further functional element arrangement in accordance with the invention and also the attachment of it to a component 10.

The functional element 20 is in this example a so-called RSU element of the company Profil Verbindungstechnik GmbH & Co. KG and is described in detail in the European patent application with the publication number 0 759 510, with detailed statements for the attachment of this element to a sheet metal part also being described there and applying here.

The functional element 20, which consists of a body or head section 24 and a riveting section realised here as an external forming section is likewise used in this embodiment with an auxiliary joining part 22 in the form of an inverse, plate-like sheet metal part, which essentially has the same shape as the auxiliary joining part 22 of FIG. 1, but with the exception that the auxiliary joining part 22 has a smaller height here for adaptation to the respective thickness of the component 10. In this embodiment the component 10 is also pre-holed, in particular pre-drilled, and provided with a stepped bore 46 which has a section 48 with a smaller diameter and a section 50 with a larger diameter. The section 48 is matched in diameter to the outer diameter of the functional element 20 and has an axial length (in the axial direction 68) which corresponds at least substantially to the axial length of the functional element 20. The inner diameter of the section 50 of the stepped bore 56 corresponds at least substantially to the outer diameter of the dish 44 of the plate-like part and has an axial length which corresponds to the height of the auxiliary joining part 22 less its sheet metal thickness.

Figure 5A:
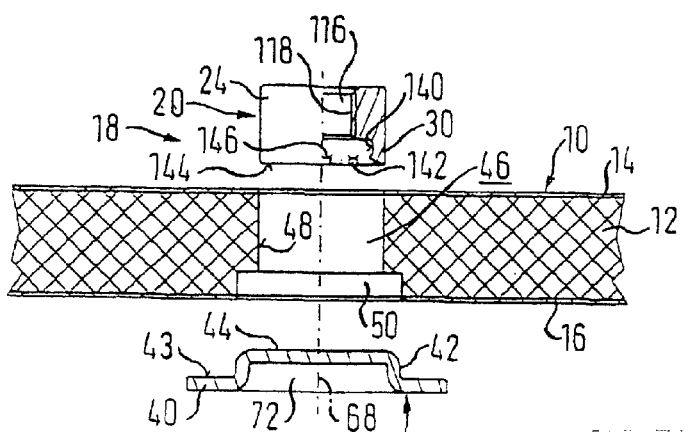
Figure 5B:
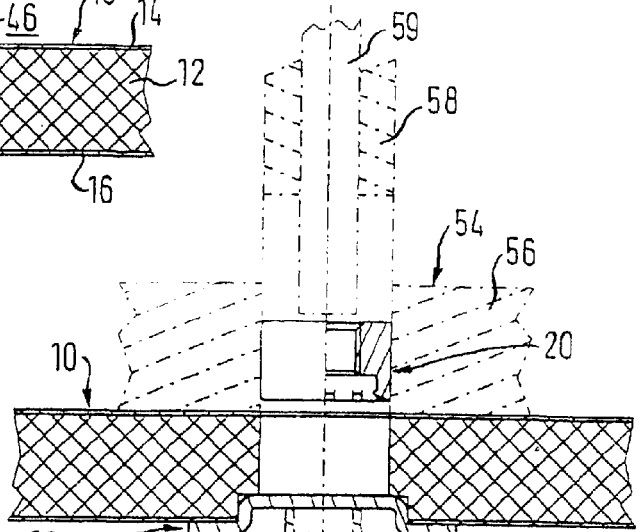
Figure 5C:
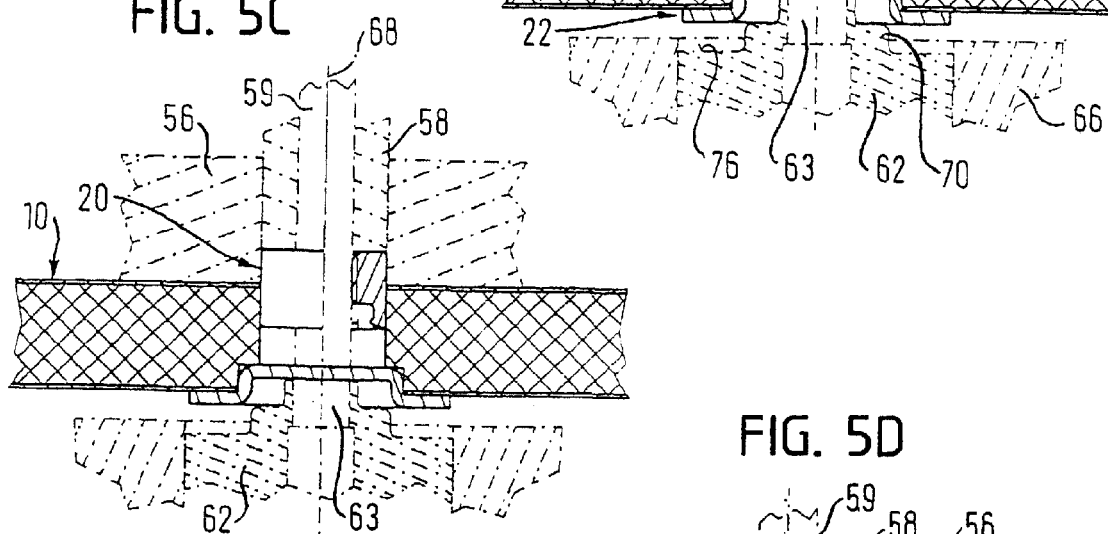
Figure 5D:
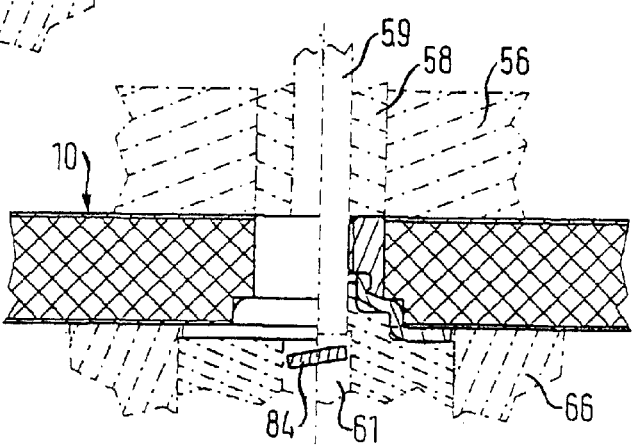

The attachment of this functional element arrangement 18 to the component 10 can be seen from the drawings of FIGS. 5B to 5D. Here, a setting head 54 is also used with a hold-down member 56 and a plunger 58, however, with the special feature that here a preceding hole punch 59 is arranged coaxial to the plunger 58.

During the attachment of the functional element 20 in the component 10 the auxiliary joining part 22 is supported on a die 62 which is accommodated in a lower tool 66. The precise shape of the die 62 used here is described in the above named European patent application and will not be explained again in detail here. It should, however, be pointed out that the die 62 which is used has a ring projection in the form of a so-called hole forming punch projection 63 which, in this example, supports the base region 44 of the auxiliary joining part 22 and during the closing of the press and the downwardly directed movement of the hole punch 59 makes it possible to stamp a stamping slug 84 in accordance with FIG. 5D out of the auxiliary joining part. The ring projection 63 is located in this example at the upper end face of a shaped projection 70 of the die 62.

The auxiliary joining part 22 is here centred in the component 10 by the bore section 50. For the centring in a lower tool 66 the die could be executed as a telescopic die 62 with an outer, upwardly biased cylinder (not shown), the inner wall of which surrounds the shown die 62 and which, in FIG. 5B, projects upwardly beyond the surface 76 of the die 62 and cooperates with the radially outer wall of the auxiliary joining part 22. During closing of the press, i.e. during the transition from the position of FIG. 5B or FIG. 5C into the FIG. 5D, this outer cylinder would then deflect rearwardly until its upper end face is flush with the upper side of the tool 66. Here the edge region 40 of the auxiliary joining part 22 is also supported on the support surface 76 of the die 62, with the die 62 being recessed relative to the tool 66 by the sheet metal thickness of the auxiliary joining part 22.

The setting head 46 and the die 62 can be installed, as previously explained, in a press tool, can, however, likewise also be carried by a robot or installed in some other form of tool.

During the attachment of the functional element 20 and of the auxiliary joining part 22 to a component in a press this is first closed, so that the hole diameter 56 presses the component 10 against the upper end face of the lower tool 66 (FIG. 5B). During the further closing movement of the press the pre-holing punch 59 is pressed downwardly with the plunger 58, fits through the thread cylinder of the functional element 20 and comes in the state of FIG. 5C into contact with the base region 44 of the auxiliary joining part 22. During this movement the end face of the plunger 58 moves against the upper end of the functional element 20 in FIG. 5B and presses the latter partly into the bore section 48 of the component 10. During the further closing movement of the press the pre-holed punch 59 presses the punching slug 48 out of the base region of the plate-like auxiliary joining part 22. This is disposed of via a central bore 61 of the die. At the same time the ring projection 63, i.e. the hole forming punch projection of the die 62, presses the edge region of the hole of the now holed auxiliary joining part 40 upwardly and radially outwardly, so that this edge region is pressed into the undercuts 140 of the ring wall of the functional element 20. These undercuts 140 are formed in a hollow body element of this kind by radially extending projections which arise during manufacture of the elements during the production of the recesses 142 in the lower end face 144 of the nut element. That is to say, that by forming the radially extending recess 142 by means of a cold heading process the radially inwardly directed projections are formed at the corresponding positions which in turn form the undercuts 140. The form-fitted connection between the auxiliary joining part and the nut element in the region of the undercuts 140 and the recesses 142 ensures that the nut element is rotationally fixedly secured relative to the auxiliary joining part.

Around the hole forming punch projection 63 there are now located, as described in more detail in the European patent 0 759 510, a plurality of noses which bridge the transition into the end face of the projection 70 and serve for a particularly secure attachment of the functional element 20 to the auxiliary joining part 22 in the region of the forming section 30. This is shown at the reference numeral 65 in FIG. 5E where the sheet metal of the auxiliary joining part is pressed in by such a nose.

Figure 5E:
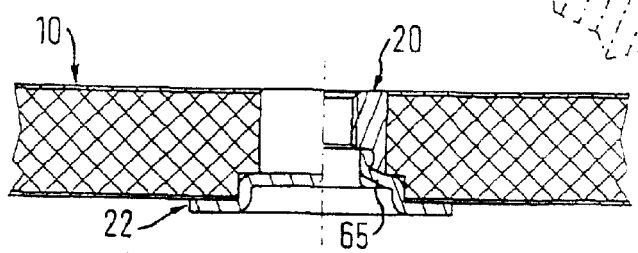

After the removal of the assembled part from the press it is shaped precisely as shown in FIG. 5E.

It should be noted that the nut element 20 in this example does not have any features of shape which come into contact directly with the component and could serve for a security against rotation. It would, however, be possible to make the nut element 20 not circular in plan view, but rather polygonal with a grooved surface and to ensure a security against rotation by the engagement of this jacket surface of the nut element in the component 10. Moreover, it would be possible to provide the element with a flange, as will subsequently be explained in more detail with reference to FIG. 6.

In this example, the security against rotation is formed solely by an adhesive which is provided on the surface regions of the nut element 20 which come into contact with the component 10 and/or with the auxiliary joining part 22 and/or on the surface regions of the auxiliary joining part 22 which come into contact with the component 10 and/or with the nut element. That is to say that, in this example, the adhesive forms the sole device providing security against rotation.

In the screwed in situation the further component is screwed onto the upper side of the component assembly by means of a screw which is screwed into the thread cylinder of the nut element 20. That is to say that the further component (not shown here) and the first named component 10 are held by compression between the edge region 40 of the auxiliary joining part 22 and the head of the corresponding screw.

FIG. 6A shows a further functional element arrangement in accordance with the invention which is very similar to the functional element arrangement 18 of FIG. 5. The difference lies only in that here the nut element 20 is provided with a flange 32 and with noses providing security against rotation in accordance with FIG. 1. The noses 38 providing security against rotation extend here (as in the example of FIG. 1) in raised manner, both in the radial direction on the contact surface 34 and also in the axial direction along the jacket surface of the nut element 20. The method of the attachment of the functional element arrangement 18 of FIG. 6 to a component 10 is precisely the same as the method of FIG. 5. The shape of the nut element 20 in the region of the rivet connection and of the auxiliary joining part is identical to the arrangement described in FIG. 5 and thus the rivet connection takes place in the region of the forming section in similar manner to the rivet connection which is described in the European application with the publication number 0 759 510.

In this functional element arrangement the special advantage also results that on attachment of the functional element arrangement the axial spacing between the contact surface 34 and the upper side of the edge region 40 of the auxiliary joining part is precisely predetermined and also precisely matched to the component. In this embodiment the further advantage also results in that one only needs one nut element 20 for a wide range of component thicknesses, since the adaptation of the different thicknesses of different components can be achieved by corresponding choice of the height of the auxiliary joining part that is required. Here it is then also necessary to operate with a die matched to the height of the auxiliary joining part and to effect the pre-holing or pre-drilling of the component 10 accordingly.

In the embodiment of FIG. 6 the further component can either be screwed to the top side of the first named component 10 or to the lower side of the same. It is simply necessary to provide a stepped bore in the further component in the manner of the previous description in accordance with the selected arrangement.

FIG. 7 shows a further embodiment based on the RSU element of the company Profil Verbindungstechnik Gmb & Co. KG and is basically very similar to the embodiment of FIG. 5. The only difference here is that ribs 39 extending in the axial direction are provided at the jacket surface of the nut element 20 which, on insertion of the elements into a component 10, form corresponding grooves there and serve in this manner for the security against rotation. In other respects the description of FIG. 5 and, as required, of FIG. 6 applies precisely as previously to the embodiment of FIG. 7 which is brought to expression by the use of corresponding reference numerals, so that these details do not need to be explained again.

FIG. 8 now shows a further variant of the functional element arrangement 18 in accordance with the invention in which the functional element 20 represents a modified form of the so-called RND nut of the company Profil Verbindungstechnik Gmb & Co. KG and the region of the rivet section 30 is formed in accordance with the European patent 0 539 793.

Whereas, in a customary RND element, the rivet section 30 directly adjoins the flange 32, the hollow body element 20 here is provided with an intermediate step 36. That is to say that the rivet connection takes place here also between the rivet section 30 and the ring shoulder located between the rivet section 30 and the intermediate step 36, whereas the noses 38 providing security against rotation are located in the transition region between the flange 32 and the intermediate step 36. The noses 38 providing security against rotation extend, as described in the embodiment of FIG. 1, in raised manner in the radial direction at the contact surface 34 on the lower side of the flange 32 in FIG. 8 and in the axial direction in raised form along the intermediate step 36.

Whereas, in the customary RND element, the radially extending regions of the noses providing security against rotation are located in a ring-like recess below the flange 32, this is not necessary here, since the rivet connection into the sheet metal part does not take place beneath the flange 32, but rather beneath the intermediate step 36. In other words, the flange 32 in this example does not have any ring-like recess in the region of the transition from the intermediate step 36, although this would be possible. The auxiliary joining part 22 is also formed in plate-like manner in this example and has a planar edge region 40, a recess 42 and a base region 44 with a pre-hole 92. Moreover, the edge region 150 of the pre-hole 92 is conically set upwardly in accordance with the sheet metal preparation which is usually provided for an RND element in accordance with the European patent 0 539 793. This conical raising of the base region 44 can take place during the manufacture of the plate-like part, for example during the pre-holing of the plate-like part.

The attachment of the functional element arrangement to the component 10 also takes place here using a setting head 54 with a hold down member 56 and a plunger 58 as well as a die which is arranged in a bore of a lower tool 66 and is set back there in the axial direction by the thickness of the edge region 40 of the auxiliary joining part 22. The die has a shaped projection 70 which fits into the receiving space 72 of the auxiliary joining part 22 and serves for a centring of the auxiliary joining part 22 relative to the die. The cylindrical wall 152 of the shaped projection 70 merges via a radius 78 into the support surface 76, with the radius 78 being selected so that a small free space 78 is present relative to the auxiliary joining part in the transition region. This ensures on the one hand that the auxiliary joining part always lies intimately on the contact surface 76 and facilitates, on the other hand, the release of the auxiliary joining part from the die on opening of the press.

The arrangement within the press can take place precisely as previously. That is to say the setting head 56 can be attached to the upper tool of the press of the intermediate plate, with the die then being attached to the intermediate plate or to the lower tool of the press. The setting head could also be attached inverted to the lower tool of the press or to the intermediate plate, whereas the die would then be attached, likewise reversed, to the intermediate plate of the press or to the upper tool of the press. A robot or other tool can also be used here for the attachment of the element.

The shaped projection 70 has at the centre a cylindrical projection 156 with a smaller outer diameter than the inner diameter of the pre-hole 92, and the cylindrical projection 156 merges via inclined, gently rounded surfaces into a ring shoulder 158 of the shaped projections 70 which stands perpendicular to the longitudinal axis 68.

Whereas FIG. 8B shows the arrangement as the press closes, FIG. 8C shows an intermediate state of the attachment of the hollow body element 20 to the component or to the auxiliary joining part in which the component 10 is held firmly between the hold-down member 56 and the lower tool 66 of the press and the auxiliary joining part 22 is pressed between the support surface 76 of the die at the lower covering layer of the component into contact against this lower covering layer. The plunger 48 has in this stage of the closing of the press pressed the hollow body element 20 so far downwardly that the rivet section 30 is located within the pre-hole 92 of the auxiliary joining part 22. The noses 38 providing security against rotation have reached a position in which they are just starting to deform the upper covering layer 14 of the component 10.

In the fully closed state of the press the noses 38 providing security against rotation are, as is evident from FIG. 8D, pressed fully into the upper covering layer 14, with the ring-like contact surface 34 below the flange 32 intimately contacting the upper covering layer 14. The rivet connection between the rivet section 30 and the auxiliary joining part 22 is now finished in accordance with clamping hole riveting process in accordance with the European patent 0 539 793. In this the conically upset end region 150 of the auxiliary joining part has been pressed somewhat flat whereby an extremely high bearing pressure arises between the edge of the pre-hole 92 and the rivet section of the hollow body element 20.

Furthermore, the free end of the originally cylindrical rivet section 30 is deformed radially outwardly into a rivet bead 151, so that the edge region of the pre-hole is kept trapped in a ring groove-like recess 153 which forms during the deformation between the ring shoulder 82 and the radially outwardly deformed end of the rivet section, i.e. of the rivet bead 151.

The finished component assembly after removal from the press is now shown in FIG. 8E.

During attachment of the further component, the first named component 10 is now attached beneath the component 10 in FIG. 8E (not shown) and has for this purpose a ring-like recess in which the edge region 40 of the auxiliary joining part 22 is received. The axial depth of this ring recess should preferably correspond to the thickness of the edge region 40 of the auxiliary joining part. A recess of this kind can, however, be dispensed with when the edge region 40 is made sufficiently large, so that the pressure forces resulting between it and the component 10 lie below the critical value at which a yielding of the component 10 has to be feared.

In this embodiment the noses 38 provide the security against rotation. In addition or alternatively to this all surfaces of the hollow element 20 which enter into contact with the component 10 and/or with the auxiliary joining part 22 and/or all surface regions of the auxiliary joining part 22 which enter into contact with the component 10 and/or with the hollow body element 20, can be provided with an adhesive, preferably a dry adhesive known per se which, on the exertion of pressure satisfies its adhesive function. The use of such an adhesive has in addition the advantage that the connection between the functional element arrangement and the component is watertight.

The hollow body element 20 and/or the auxiliary joining part 22 can also be provided here, depending on the material that is used, with one or more coatings, which ensure that a corrosive action between the hollow body element and/or the auxiliary joining part and the component 10 does not arise.

In the arrangement of FIG. 8 it is, however, also possible to attach a further component to the upper side of the component assembly shown in FIG. 8E. The component must then have a corresponding ring-like recess in order to receive the flange region 32 of the hollow body element 20, with the axial depth of this ring recess being made the same as the axial height of the flange 32 or somewhat deeper.

Here the advantage also exists that one can cover a wide spectrum of component thicknesses with one element. It is only necessary to match the height of the auxiliary joining part 22 in accordance with the respective component thickness and to execute the die 62 accordingly.

FIG. 9 now shows a further variant of a functional element arrangement in accordance with the invention which is likewise based on the clamping hole riveting process of the European patent 0 539 739 B1, with the design of the functional element 20 and of the auxiliary joining part 22 in the riveting region being identical to the design in the embodiment of FIG. 8.

In distinction to the representation of FIG. 8 the hollow body element 20 is not provided with a flange in the embodiment of FIG. 8, but is instead provided with noses which extend in the axial direction 68 of the hollow body element 20 which, during insertion into the component 10, form corresponding axially directed grooves in the latter and hereby serve for the required security against rotation.

The connection to the auxiliary joining part 22 takes place here precisely in the same manner as in the functional element arrangement of FIG. 8 and will here not be explained again since the previous description also applies here.

In distinction to the arrangement of FIG. 8, it is here only possible to attach the further component above the component 10, since the noses providing security against rotation which extend in the longitudinal direction of the hollow body element which have a generally rounded shape would as a rule not provide sufficient resistance to enable the attachment of a further component beneath the component 10.

Since, during the attachment of this element, the upper side of the hollow body element 20 lies flush with the upper covering layer 14, the component which is to be screwed onto it does not need any special preparation, but must simply have a bore which enables the introduction of a screw which is screwed to the inner thread of the nut element.

Here the advantage also exists that one can cover a wide spectrum of component thicknesses with one element. It is only necessary to adapt the height of the auxiliary joining part 22 in accordance with the respective component thickness and to execute the die 62 accordingly.

FIG. 10 now shows a further embodiment of a functional element arrangement in accordance with invention, with the functional element 20 in the form of a hollow body element formed as a nut with an internal thread and with a plate-like auxiliary joining part 22.

The hollow body element 20 is here identical to the hollow body element of FIG. 5, so that the description given there also applies here.

The plate-like auxiliary joining part 20 is, however, designed differently from the auxiliary joining part 22 of FIG. 5 and is inserted with the hollow body element 20 into the component 10 from the same side instead of from the opposite side as in FIG. 5. The axial depth of the recess 44, i.e. of the receiving chamber 72, is selected in this example to be identical to the axial length of the hollow body element 20. The embodiment shown here is formed in accordance with FIG. 5 for use with a preceding hole punch 59.

The attachment of the functional element arrangement 18 of FIG. 10 will now be explained in more detail with reference to the FIGS. 10B to 10D.

The attachment also takes place here using a setting head 54 and a die 62. The setting head 54 includes a hold-down member 56 with a bore which is designed to receive the hollow body element 20, i.e. has an inner diameter which at least substantially corresponds to the outer diameter of the hollow body element 20 and with a plunger 58 with a pre-hole punch 59 coaxially arranged therein. In this example, the component 10 likewise has a stepped bore 46 with a section 50 with a larger diameter which corresponds to the outer diameter of the recess 44 of the auxiliary joining part 22 and at section 48 with a smaller diameter which is dimensioned to receive the shaped projection 70 of the die 62. The axial length of the bore section 50 corresponds to the axial height of the auxiliary joining part 22 less its sheet metal thickness while the axial length of the bore section 48 corresponds to the axial height of the shaped projection 70 between the ring shoulder 77 and the ring-like support surface 76. In this example the hollow body element 20 and the auxiliary joining part 22 are inserted into the component 10 at the side of the component 10 where the bore section 50 with the larger diameter is located.

Above the shaped projection 70 there is, in the die 62 of FIG. 10, a ring projection 63 which has an inner diameter which corresponds to the outer diameter of the pre-hole punch 59.

During closing of the press the pre-hole punch 59 punches through the base region 44 of the auxiliary joining part 22 and the punching slug 84 is removed through the central bore of the die, which has a larger diameter in the region beneath the shaped projection 70. Directly after the punching through of the base region 44 of the auxiliary joining part 22 the cylindrical projection 63 deforms the edge region of the punched hole radially outwardly and upwardly, so that the form-fitted engagement in accordance with FIGS. 10D and 10E arises. In this way, the nut element is connected in a force-transmitting and form-locked manner to the auxiliary joining part and indeed also with a security against rotation in the region of the interengaged surfaces of the auxiliary joining part 22 and of the nut element 20.

In this embodiment the auxiliary joining part 22 is provided at the surfaces which come into contact with the component 10 or with the hollow body element 20 with an adhesive. This adhesive, which is also preferably a dry adhesive here, which is activated under pressure, forms an adhesive bond between the auxiliary joining part and the component which represents a device for ensuring the security against rotation. A security against rotation between the hollow body element 20 and the auxiliary joining part in any event arises by the interengagement of the auxiliary joining part and of the hollow body element in the region of the radial recesses 142 provided in the end face in the hollow body element and in the region of the undercuts 140 formed by the radial recesses. Should adhesive be provided at the contact surface of the hollow body element 20 and of the auxiliary joining part 22, then this also serves for an additional security against rotation in this region.

The outer diameter of the cylindrical projection 63 of the die is larger than the outer diameter of the thread cylinder, so that on screwing a further component to the component 10, the corresponding screw can be screwed into the thread coming from the lower side in FIG. 10E.

A special advantage of this arrangement lies in the fact that with one element and one auxiliary joining part 22 a connection to components of different thickness can be brought about. It is simply necessary to select the axial length of the bore section 48 in corresponding manner and to adapt the specific design of the die to this length. Strictly speaking, it is not necessary for the axial depth of the inner space 72 of the auxiliary joining part 22 to correspond precisely to the axial length of the hollow body element 20. These lengths could, if required, be selected different from one another. In any event, the arrangement shown ensures that on attaching the functional element arrangement to the components 10 a precisely controlled rivet connection and a precisely preset installation situation is always maintained. The force exerted by the hold-down member 56 onto the auxiliary joining part 22 ensures that the edge region 40 of the auxiliary joining part 22 always lies intimately against the upper covering layer 14 of the component 10. During the pressing in movement of the auxiliary joining part, which is centred here by the bore section 50, the component 76 is supported on the supporting surface 76 of the die or on the surface of the tool 66 arranged flush to it. After manufacturing the rivet connection in the region of the forming section 30, the lowermost position of the plunger is determined by the axial height of the assembly consisting of the shaped projection 70, the axial thickness of the auxiliary joining part 22 in the region of the rivet connection and the axial length of the hollow body element 20. In other words, in this arrangement it is always ensured that the pressing force exerted by the plunger is always sufficient to rivet the auxiliary joining part in a form-fitted manner to the element. A deformation which goes beyond this, which should be undesirable, because it would lead to a deformation of the thread cylinder is prevented in that the maximum force which can be exerted by the plunger onto the element is so dimensioned that it does not lead to any permanent deformation of the cylindrical region which is formed by the shaped projection of the die, the reformed base region of the auxiliary joining part and the body of the auxiliary joining element.

In the embodiment of FIG. 10 the further component to be screwed into place is screwed onto the lower side of the component assembly in accordance with FIG. 10E and here no special preparation of the further component is required. It must simply have a passage hole for the screw that is used.

FIG. 11 now shows a further embodiment of a functional element arrangement in accordance with the invention in which a novel element 20 is used.

The element 20 has namely in this example a substantially cylindrical body 170 with an internal thread 118 and a rivet section 30 at one end. At the other end of the body 170 of the hollow body element 20, i.e. at the end remote from the rivet section 30, this has in this example six radially arranged noses 39 providing security against rotation which, in cross-section, have a rounded-off shape, as is evident from FIG. 11B, and which extend in the upper region of the hollow body element in raised, but tapered form axially along the latter. The functional element 20 is used here with an auxiliary joining part 22 which can indeed be termed a plate-like element in which, however, in this embodiment, no base region is provided. That is to say, the auxiliary joining part 22 consists in this example of a tubular section 172 and the ring-like edge region 40, with the inner diameter of the tubular region 172 corresponding to the outer diameter of the hollow body element 20. Here, the functional element arrangement 18, i.e. both the hollow body element 20 and also the auxiliary joining part 22, are introduced from one side into the component 10 which, for this purpose, simply needs to have a cylindrical through going bore with a diameter which corresponds to the outer diameter of the tubular section 172.

The FIGS. 11C to 11E show how the functional element arrangement 18 of FIG. 11 is joined together and attached to the component 10.

In the stage of FIG. 11C, the auxiliary joining part 22 is already introduced into the component, so that the tubular section 172 is located fully within the bore 46. The edge region 40 of the auxiliary joining part lies essentially against the upper covering layer 14 of the component 10. The lower covering layer 16 of the component 10 lies on the supporting surface 76 of the die 62, which is arranged in a bore within a tool 66, in this case with the support surface 76 flush with the upper side of the tool 66. The die 62 has a shaped projection 70 which has an outer diameter which corresponds in diameter to the bore 46 and is arranged in FIG. 11C within this bore, so that the component 10 is precisely positioned by the die 62.

At its upper end in FIG. 11C the shaped projection 70 has a projection 176 of smaller diameter which merges via a concavely rounded side surface into a ring shoulder 178. The hollow body element 20 is located within a setting head 54 which, as previously, has a hold-down member 56 and a plunger 58.

In the state of FIG. 11D the hold-down member 56, which has a ring recess 180 with an axial depth corresponding to the thickness of the edge region 40 of the auxiliary joining part, presses on this edge region 40 of the auxiliary joining part 22 and ensures that the auxiliary joining part intimately contacts the upper covering layer 14 of the component 10 in this region.

During the further closing of the press the plunger moves further downwardly and presses the hollow body element 20 fully into the auxiliary joining part 22, so that the noses 38 providing security against rotation cause a corresponding deformation of the auxiliary joining part and this in turn indents the component 10 in the region of the upper covering layer 14 and in the upper region of the core 12, so that the hollow body element 20 is rotationally securely arranged within the auxiliary joining part 22 and the auxiliary joining part 22 is rotationally securely arranged relative to the component 10. At the same time as the pressing in of the hollow body element 20, the cylindrical projection 176 of the die 62 presses the end of the rivet section 30 radially outwardly so that the latter, as shown at 182, is deformed radially outwardly over the lower end of the tubular section 172 of the auxiliary joining part 22. It is evident from this that the hollow body element 20 and the auxiliary joining part 22 are now inseparably connected to one another.

A further axial movement of the hollow body element 20 through the auxiliary joining part 22 is not possible because the noses 38 providing security against rotation contact the auxiliary joining part. An extraction of the hollow body element 20 out of the auxiliary joining part 22 in the opposite direction is not possible because the rivet bead 182 prevents this. The security against rotation between the hollow body element 20 and the auxiliary joining part 22 is ensured by the engagement of the noses 39 providing security against rotation in the wall region of the auxiliary joining part 22. The security against rotation of the functional element arrangement consisting of the hollow body element 20 and the auxiliary joining part 22 relative to the component 10 is ensured by the engagement of the wall regions 23 of the auxiliary joining part 22 deformed by the noses 38 providing security against rotation into the correspondingly deformed component. Here, the surface regions of the auxiliary joining part which come into contact with the component 10 and/or with the hollow body element can be provided with an adhesive, preferably a dry adhesive, which is activated on the exertion of pressure to form an adhesive bond.

In this embodiment a functional element 20 and an auxiliary joining part 22 can also be used with components of different thickness, since it is simply necessary to design the die 62 accordingly.

In the embodiment of FIG. 11E, on screwing on a further component, this is also screwed onto the lower side of the component assembly of FIG. 11F for which no special preparation of the component is necessary.

FIG. 12 now shows a further variant of the functional element arrangement in accordance with the invention. This functional element 20 is a modified embodiment of an SBF element of the company Profil Verbindungstechnik Gmb & Co. KG approximately in the manner shown in U.S. Pat. No. 4,459 and in particular in U.S. Pat. No. 4,555,838 (FIG. 7).

In distinction to the previously known form of such an element, an intermediate step 36 is provided here between the flange part and the rivet section 30, with an outer diameter which corresponds to the outer diameter of the rivet section 30. The functional element which is realised here as a bolt element is in this example used with an auxiliary joining part 22 in the form of a flat washer, with the hole 92 having a diameter which is only fractionally smaller than the outer diameter of the rivet section 30. The die used for the attachment of the bolt element 20 has here a ring recess 190 which is formed to receive the washer-like auxiliary joining part 22 and has an axial depth which corresponds to the thickness of the washer.

The base surface 192 of the ring-like recess 190 which serves as a support surface for the washer is arranged perpendicular to the longitudinal axis 68 and the cylindrical ring wall 191 of the ring-like recess 190 ensures the centring of the washer 22. The die has a shaped projection 70 which merges via a rounded ring groove 190 into the support surface 192 and these features are designed the same as the correspondingly shaped features of the die of U.S. Pat. No. 4,555,638 (FIG. 11).

The die is aligned coaxially to the bolt element 20, with the ring recess 190, the shaped projections 70 and the ring recess 194 likewise lying coaxially to the central longitudinal direction of the bolt element 20.

In this embodiment the component 10 has the cylindrical bore 46 with a diameter which corresponds to the outer diameter of the rivet section 30 or of the intermediate step 36. The lower side of the flange 32 is provided with the customary noses 38 and recesses 41 providing security against rotation which are used with a customary SBF bolt.

The attachment of the bolt element to the component 10 or the riveting to the auxiliary joining part 22 takes place as previously using a setting head, which is not shown here, but which corresponds to the setting head 54 which was explained in more detail in connection with FIG. 2. The die 62 is likewise located in a lower tool which is, however, not shown here.

During closing of the press or of the attachment tool, the flange 32 of the bolt element 20 is brought into contact with the upper covering layer 14 of the component 10. The noses 38 and recesses 41 providing security against rotation are pressed into the upper covering layer, or regions of the upper covering layer are received into the corresponding recesses. At the same time the rivet section 30 is rolled outwardly as a result of the shaping of the shaped projection 70 with the ring-like recess 194 in order to form a so-called L-type rivet bead 196 which is, for example, shown in U.S. Pat. No. 4,555,838 (FIG. 11). During this riveting process the auxiliary joining part is pressed intimately against the lower layer 16 of the component 10, so that, after completion of the rivet connection, the component 10 is kept trapped between the flange 32 and the auxiliary joining part 22. In this arrangement the noses and recesses providing security against rotation serve for the required security against rotation in the region of the contact surface of the flange 32. The axial length of the intermediate step 36 takes care of the required adaptation to the thickness of the component and determines the degree of compression of the component during the attachment of the functional element arrangement.

When screwing a further component onto the component assembly in accordance with FIG. 12B the further component is placed, coming from above, over the thread of the bolt element and secured with a nut element, essentially as shown in FIG. 2G. The axial tension forces arising hereby in the bolt element 20 are transmitted via the rivet bead 80 to the auxiliary joining part 22. This lies over a large area at the lower side of the component 10 in FIG. 12B and distributes the corresponding compression forces there, so that the component 10 is loaded with forces which do not exceed the maximum permissible forces.

Although the bolt element 20 is shown here as a non-self-piercing variant, it would also be conceivable to make the rivet section 30 self-piercing and to select the die accordingly, as explained in more detail in U.S. Pat. No. 4,555,838.

FIG. 13 now shows a further variant of the functional element arrangement in accordance with the invention utilising a functional element in the form of a customary SBF bolt and an auxiliary joining part in the form of a washer. This embodiment corresponds largely to the embodiment of FIG. 12, only here the use of an intermediate step is dispensed with. That is to say that the bolt element 20 actually represents a customary SBF element. The bolt element 20 is used here with an auxiliary joining part in the form of a washer which corresponds to the washer of FIG. 12. Other than in the embodiment of FIG. 12, the washer is, however, here supported on a ring shoulder 47 which is located in a stepped bore 46 in the component 10 and represents the transition from a section 50 of larger diameter into a section 48 of smaller diameter. The die 62 of FIG. 13 is formed in the forming region in accordance with the die 62 of the FIG. 12, but does not have a ring recess 190 here, but rather a cylindrical region 200 which merges via a ring shoulder 202 into the cylindrical outer jacket 204 of the die 62. This ring shoulder 202 lies, during the attachment of the functional element arrangement in the component 10, on the lower covering layer 16 in this example.

The attachment of the bolt element 20 takes place here analogously to the attachment of the functional element 20 of FIG. 12, so that the component assembly of FIG. 13B arises.

On screwing on a further component this is screwed in FIG. 13 to the underside of the component assembly using a nut, as shown in FIG. 12G.

This embodiment has the advantage that a customary SBF element can be used and that one element can be used for components 10 of different thickness, since it is only necessary to select the axial depth of the stepped bore 46 accordingly in the region of the bore section 50 of larger diameter. An element with an intermediate step in accordance with FIG. 12 can also be used here, i.e. with a washer which contacts a ring shoulder 47 in a stepped bore 46 of the component 10. It is also possible here to use one bolt element to cover a range of different component thicknesses, it is only necessary to select the position of the ring shoulder 47 accordingly.

Figure 14A:
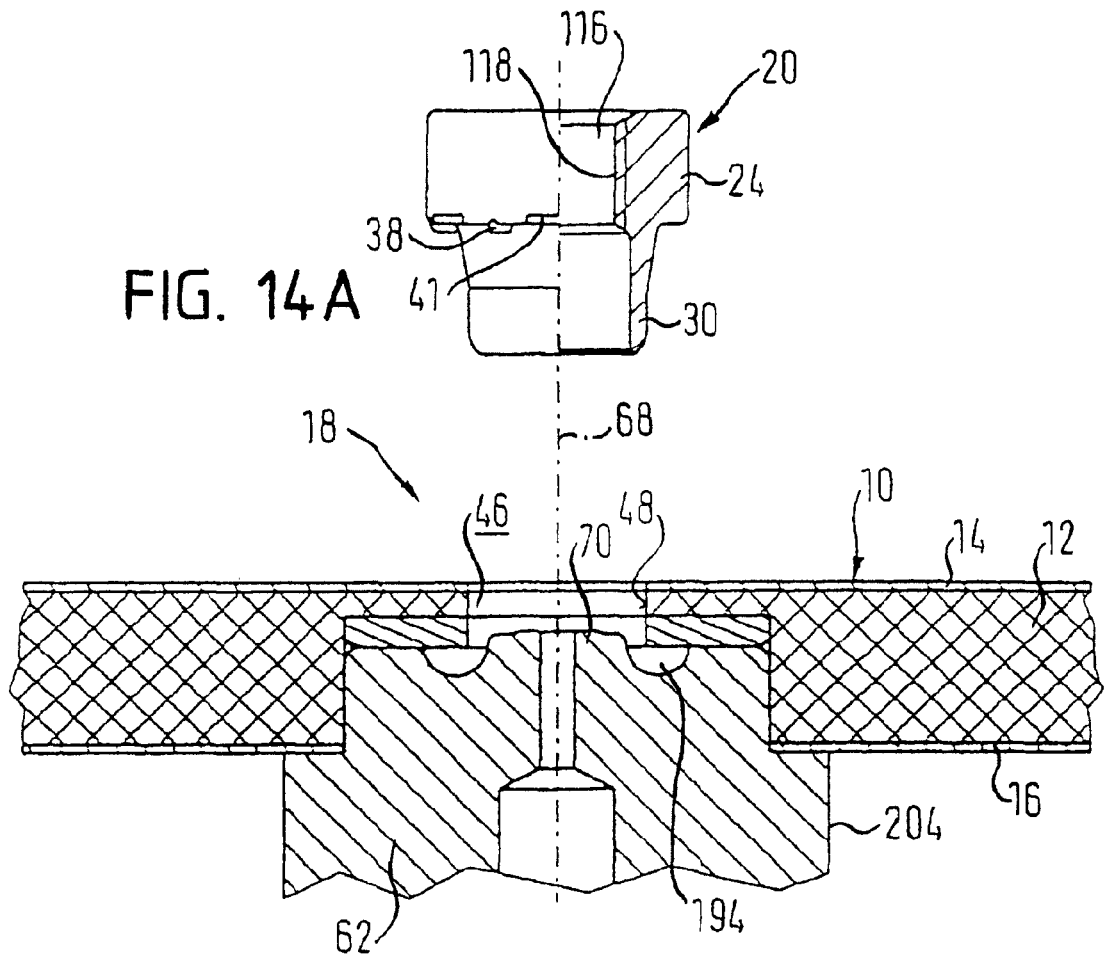
Figure 14B:
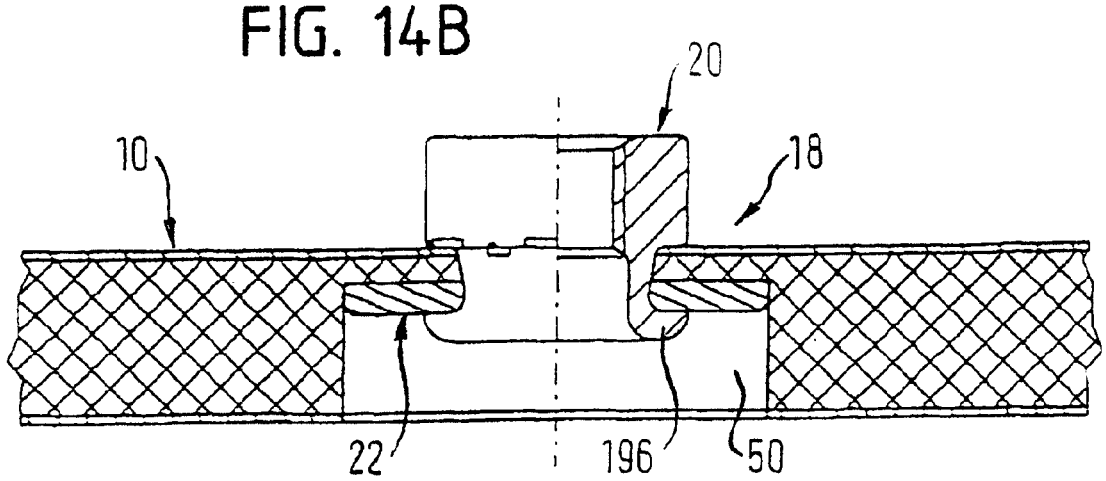

Finally, FIGS. 14A and 14B show a further variant of an arrangement in accordance with the invention, similar to the arrangement of FIG. 13, but using a functional element in the form of a hollow body element with internal thread.

This is a customary RSF element of the company Profil Verbindungstechnik Gmb & Co. KG, as described in U.S. Pat. No. 4,610,072.

This element is also used with an auxiliary joining part in the form of a washer using the same type of die 62 as described in connection with FIG. 13. Here, one element can also be used for various component thicknesses, since it is here only necessary to select the axial length of the bore section 50 of larger diameter accordingly. That is to say the length of the bore section 48 of smaller diameter always remains constant.

The above description of embodiments has been set forth exclusively with specific representation of elements from the component Profil Verbindungstechnik Gmb & Co. KG, frequently in modified form. A series of other fastener elements known per se can, however, also be used for the present invention. These must be used in each case with an auxiliary joining part and then assume an appropriate design of a cylindrical or stepped bore in the component.

As an alternative to this, the other fastener elements known per se can likewise be provided with an intermediate step between a flange region and a riveting region, with the riveting of the auxiliary joining part to the so modified fastener element then taking place in the region of the transition from the intermediate step into the rivet section of the internal forming section or the external forming section, whereas the flange part is formed at the other end of the intermediate step for contact at the component and is preferably provided for this purpose with features providing security against rotation, such as raised noses providing security against rotation and/or recesses providing security against rotation, in the area of the corresponding contact surfaces or on the outer jacket of the intermediate step.

For other fastener elements known per se, adhesives can also be used which are to be provided at surface regions which come into contact with the component and/or with the auxiliary joining part. For these other fastener elements it can also be sensible to provide the element or the auxiliary joining part that is used with one or more coatings which prevent a corrosive action with the component that is used. When using other fastener elements it is likewise possible to form the auxiliary joining parts of plastic or fibre-reinforced plastic, if required.

As described above, the embodiments of the present invention which are used with plate-like auxiliary joining parts offer the advantage that one can achieve an adaptation to different component thicknesses by using auxiliary joining parts of different height.

For some constructions the components that are used can have a considerable thickness, for example 50 mm or larger. This can then lead to a situation in which the recessed region of the auxiliary joining part becomes relatively deep, so that the plate-like part has an axial cross-section or shape which should rather be termed a top hat. Thus, the designation of the auxiliary joining part as plate-like should also be understood so that it is not restricted to plate-like proportions, but is instead used as a generic term for a broad spectrum of auxiliary joining parts which can have only one dished region which has the proportions of a top hat or is indeed made even higher.

The invention claimed is:

1. A functional element arrangement having a functional element for attachment to a first component, the first component consisting of one of a sandwich construction and a composite construction each having first and second outer skins selected from the group comprising metal skins and plastic skins and a core disposed between said first and second skins, said core consisting of a material containing at least one of hollow cavities and pores, plastics, wood, metal foam, metal filled with hollow bodies, and a honeycomb structure, the functional element arrangement further comprising
    an auxiliary joining part formed as a plate-like part and having a flange that comes into contact with one of said first and second skins of said first component and a central portion in form of a dish like portion fitted in one of a ring recess and a stepped bore of said first component, said functional element being locked to said central portion by technical reshaping of at least one of said functional element and said auxiliary joining part during attachment of said functional element to said first component by means of a riveted connection to the auxiliary joining part, and at least one means providing security against rotation between said functional element and said first component.

2. The functional element arrangement in accordance with claim 1, said first component being pre-holed by one of machining primary forming.

3. The functional element arrangement in accordance with claim 1, wherein said first component has first and second opposite sides and said functional element and said auxiliary joining part are joined together and to said first component coming from said opposite sides of said first component.

4. The functional element arrangement in accordance with claim 1, wherein said functional element has a flange and said flange of said functional element and said flange of said auxiliary joining part are adapted to trap said first component between them.

5. The functional element arrangement in accordance with claim 1, wherein said functional element and said auxiliary joining part are adapted to be joined together and to said first component at one side of said first component.

6. The functional element arrangement in accordance with claim 1, said functional element being provided with a head section and a shaft section and having a rivet section for said rivet connection to said auxiliary joining part, said rivet section being provided at one of said head section and a transition from said head section to said shaft.

7. The functional element arrangement in accordance with claim 6, said shaft section being realized as a thread carrier for the attachment of a further component to said first component.

8. The functional element arrangement in accordance with claim 6, said shaft section being formed as a guide part for a further component.

9. The functional element arrangement in accordance with claim 6, said shaft section being formed as a clip mount.

10. The functional element arrangement in accordance with claim 6, said head section having a flange in a region of a transition from said shaft section to said head section, said flange having a surface remote from said shaft section forming a contact surface adapted to contact said first component and said head section having an end remote from the shaft section forming said rivet section.

11. The functional element arrangement in accordance with claim 10, wherein said head section consists of a flange, said rivet section and also an intermediate step lying between said flange and said rivet section.

12. The functional element arrangement in accordance with claim 11, wherein said flange has a contact surface for contacting said first component and wherein said means providing security against rotation comprise features provided in the region of at least one of said contact surface, a transition from said flange to said intermediate step and said intermediate step.

13. The functional element arrangement in accordance with claim 11, wherein said intermediate step merges via a ring shoulder into said rivet section, and said means providing security against rotation are features provided in the region between the intermediate step and the rivet section, at least one of said ring shoulder, a transition of said ring shoulder into said rivet section and at said rivet section itself.

14. The functional element arrangement in accordance with claim 6, said head section having a free end remote from said shaft section, a flange in the region of said free end forming a contact surface at which the component comes into contact and being formed in the region of the transition from the head section into the shaft section a the riveted connection to the auxiliary joining part, there being an intermediate step between said flange and said shaft section.

15. The functional element arrangement in accordance with claim 14, wherein said means providing security against rotation are features provided at at least one of said contact surface, a transition from said flange into said intermediate step and said intermediate step.

16. The functional element arrangement in accordance with claim 14, wherein said intermediate step merges via a ring shoulder into the shaft section and wherein said means providing security against rotation are features provided at at least one of said ring shoulder, a transition of said ring shoulder into said rivet section and at said or rivet section.

17. The functional element arrangement in accordance with claim 1, said functional element being formed as one of a hollow body element, a nut element, a guide sleeve and a mount for a plug-in part.

18. The functional element arrangement in accordance with claim 17, wherein said hollow body element has a head section and one of a rivet section and a forming section, and wherein said head section is subdivided into a flange and an intermediate step, with said flange forming a contact surface against which said first component comes into contact and being arranged in the region of an end of said intermediate step remote from said rivet section or said forming section.

19. The functional element arrangement in accordance with claim 18, wherein features providing security against rotation are provided in the region of at least one of said contact surface and at a transition from said contact surface into said intermediate step and at said intermediate step.

20. The functional element arrangement in accordance with claim 18, wherein said intermediate step merges via a ring shoulder into one of said rivet section or said forming section, and wherein said means providing security against rotation are features provided on at least one of said ring shoulder, at a transition to said rivet section and at at least one of said rivet section and said internal forming section.

21. The functional element arrangement in accordance with claim 17, wherein said hollow body element has a head section and one of a rivet section and an internal forming section, wherein said head section has a jacket surface without a flange, with said jacket surface merging via a contact surface into said one of said rivet section and said internal forming section, with said auxiliary joining part being in contact with said contact surface in the installed state, and said auxiliary joining part having a contact surface against which said first component comes into contact.

22. The functional element arrangement in accordance with claim 21, wherein said means providing security against rotation comprises features provided at said jacket surface of said head section.

23. The functional element arrangement in accordance with claim 21, wherein said head section merges via a ring shoulder into said rivet section and wherein said means providing security against rotation comprises features provided in the region of at least one of said ring shoulder, at a transition from said ring shoulder into said rivet section and at said rivet section.

24. The functional element arrangement in accordance with claim 17, wherein said hollow body element has one of a rivet section and a forming section and wherein said means providing security against rotation comprises features provided at one of said rivet section and said internal forming section.

25. The functional element arrangement in accordance with claim 17, wherein said auxiliary joining part has a tubular section adjoining and disposed within said flange, wherein said hollow body element fits into the tubular section and has in its end region oblique noses which, starting from a first end of said hollow body element, extend along said hollow body element in a direction towards a second end thereof and thereby reduce in their radial extent, said noses being adapted to deform said tube section in its end region and also said first component during introduction, and said hollow body element being adapted to be broadened at its other end for said riveted connection to said auxiliary joining part.

26. The functional element arrangement in accordance with claim 1, wherein said auxiliary joining part is a sheet metal part.

27. The functional element arrangement in accordance with claim 26, wherein said sheet metal part is provided with at least one of a metallic coating and a plastic coating.

28. The functional element arrangement in accordance with claim 1, wherein said auxiliary joining part is one of a plastic component and a fibre reinforced plastic component.

29. The functional element arrangement of claim 28, wherein said auxiliary joining part is provided with a metallic coating.

30. The functional element arrangement in accordance with claim 29, wherein said coating consists of a material which is corrosion resistant with respect to a material or materials of said first component and with respect to the material of one of said functional element and a coating provided thereon and wherein said material of said functional element and of any coating provided thereon is corrosion resistant with respect to said material or materials of said first component.

31. The functional element arrangement in accordance with claim 1, wherein said auxiliary joining part has a marginal region defining said flange and wherein said central portion is a dished portion adapted to be arranged in one of a ring recess and a stepped bore of said first component.

32. The functional element arrangement in accordance with claim 31, wherein said dished portion has a base and said base is pre-holed to receive a rivet section of said functional element.

33. The functional element arrangement in accordance with claim 31, wherein said dished portion has a base, with said base not being pre-holed, but being piercable during the attachment of the functional element by one of a pierce and rivet section of said functional element and a preceding hole punch.

34. The functional element arrangement in accordance with claim 1, wherein said auxiliary joining part is formed as a flat disc having a marginal region forming said flange and a central region for said riveted connection to said functional element.

35. The functional element arrangement in accordance with claim 1, wherein at least one of said functional element and said auxiliary joining part is provided with an adhesive at least one surface region which, on attachment to said first component, enters into contact with at least one of said first component and the other respective one of said functional element and said auxiliary joining part.

36. The functional element arrangement in accordance with claim 35, wherein said adhesive is a dry adhesive which serves for an adhesive bond on the exertion of pressure.

37. The functional element arrangement in accordance with claim 35, wherein said adhesive forms said means for a providing security against rotation.

38. The functional element arrangement in accordance with claim 1, wherein said means for providing a security against rotation comprise features of shape in the form of at least one of noses and recesses which are provided at at least one of said functional element and said auxiliary joining part and which can be respectively pressed into said first component during the attachment of said functional element to said first component and receive material pressed out of said first component.

39. The functional element arrangement in accordance with claim 38, wherein said functional element is provided with a flange which forms a contact surface against which said first component comes into contact and wherein said means for providing security against rotation is formed by noses which are provided on at least one of said flange of said functional element, transition from said flange into said functional element and at said flange of said auxiliary joining part.

40. The functional element arrangement in accordance with claim 1, wherein said auxiliary joining part is a plate-like part, having an edge region forming said flange against which said first component comes into contact and a dished central region, with said edge region being initially conically shaped and diverging in the direction of said dished central region and said dished central region being formed to receive a rivet section of said functional element which can be received into said dished central region from a side of said auxiliary joining part formed by said edge region, and wherein said riveted connection results in said edge region being pressed flat and said dished central region being reshaped.

41. The functional element arrangement in accordance with claim 40, wherein said edge region of the plate-like part is interrupted at a plurality of points.

* * * * *